United States Patent
Oishi et al.

(10) Patent No.: US 6,563,859 B1
(45) Date of Patent: May 13, 2003

(54) RECEIVER AND RECEIVING METHOD IN MULTI-CARRIER SPREAD-SPECTRUM COMMUNICATIONS

(75) Inventors: Yasuyuki Oishi, Kanagawa (JP); Michiharu Nakamura, Kanagawa (JP); Kazuo Nagatani, Kanagawa (JP); Hajime Hamada, Kanagawa (JP); Yoshihiko Asano, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/440,341

(22) Filed: Nov. 15, 1999

(30) Foreign Application Priority Data

Mar. 1, 1999 (JP) .......................................... 11-052710

(51) Int. Cl.[7] .............................................. H04B 1/707
(52) U.S. Cl. ........................ 375/148; 375/150; 375/152
(58) Field of Search ................................ 375/142, 143, 375/144, 148, 150, 152

(56) References Cited

U.S. PATENT DOCUMENTS 6,072,822 A * 6/2000 Naruse et al. .............. 375/147
6,160,841 A * 12/2000 Stansell et al. ............. 375/148
6,219,376 B1 * 4/2001 Zhodzishsky et al. ...... 375/148
6,278,725 B1 * 8/2001 Rouphael et al. ........... 375/148

FOREIGN PATENT DOCUMENTS

| EP | 0 716 520 A1 | 6/1996 |
|----|--------------|--------|
| JP | 7-170242 | 7/1995 |
| JP | 7-170243 | 7/1995 |

* cited by examiner

Primary Examiner—Don N. Vo
(74) Attorney, Agent, or Firm—Katten Muchin Zavis Rosenman

(57) ABSTRACT

A multi-carrier signal received by an antenna is converted into a signal of an IF band by an RX, and converted into an I signal and a Q signal by an quadrature detector. The I signal and the Q signal as multi-carrier signals are converted into digital signals by an A/D converter, and input to complex filters. The complex filters extract a complex signal having a specified carrier. Then, complex filters shift the center frequency of the extracted complex signal into 0 Hz. The obtained base band signal is input to a finger, and despread and demodulated. The despread and demodulated signal is RAKE synthesized by a synthesis unit, and transmitted to a signal discrimination unit.

22 Claims, 19 Drawing Sheets

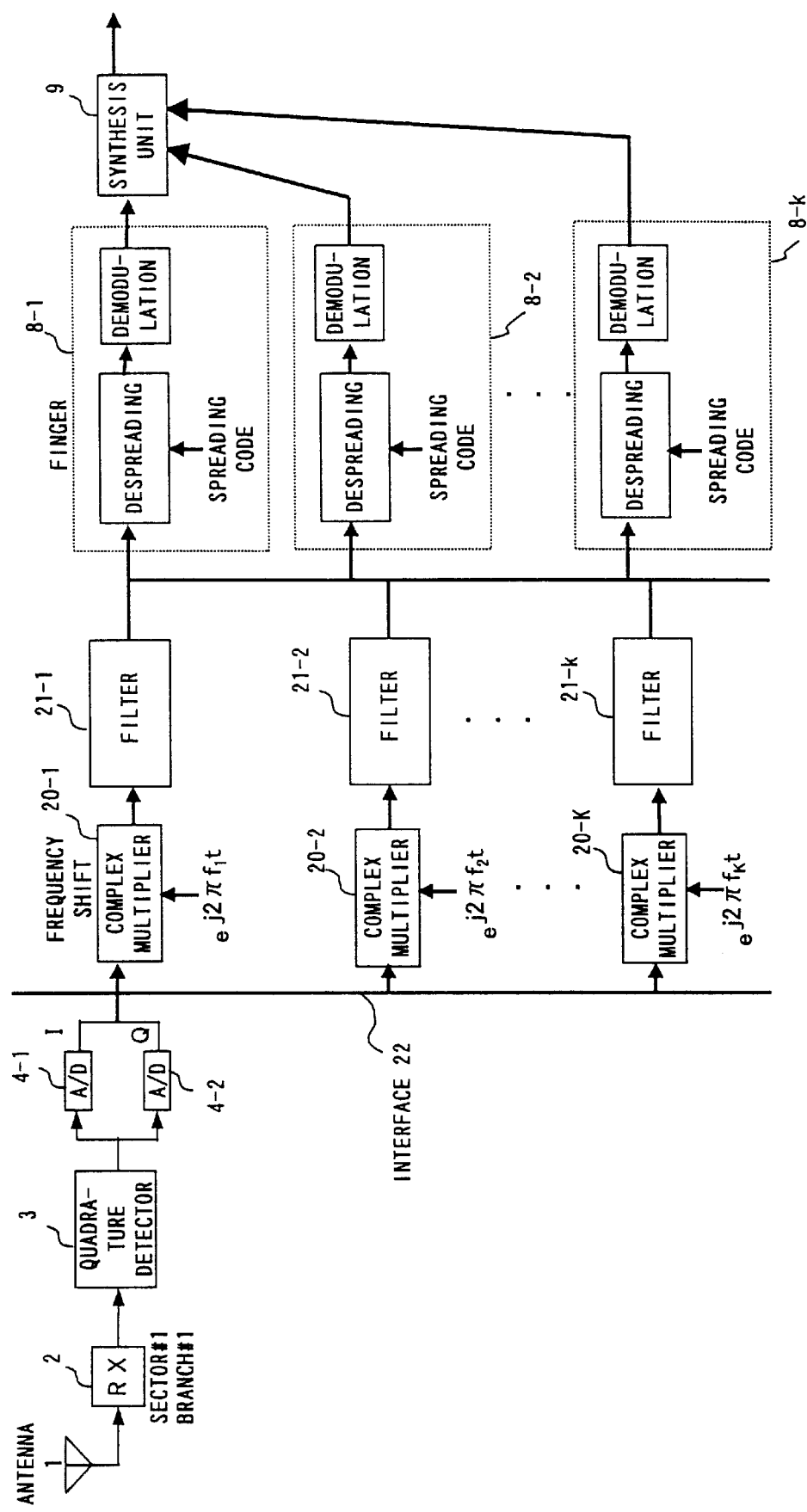
F I G. 4

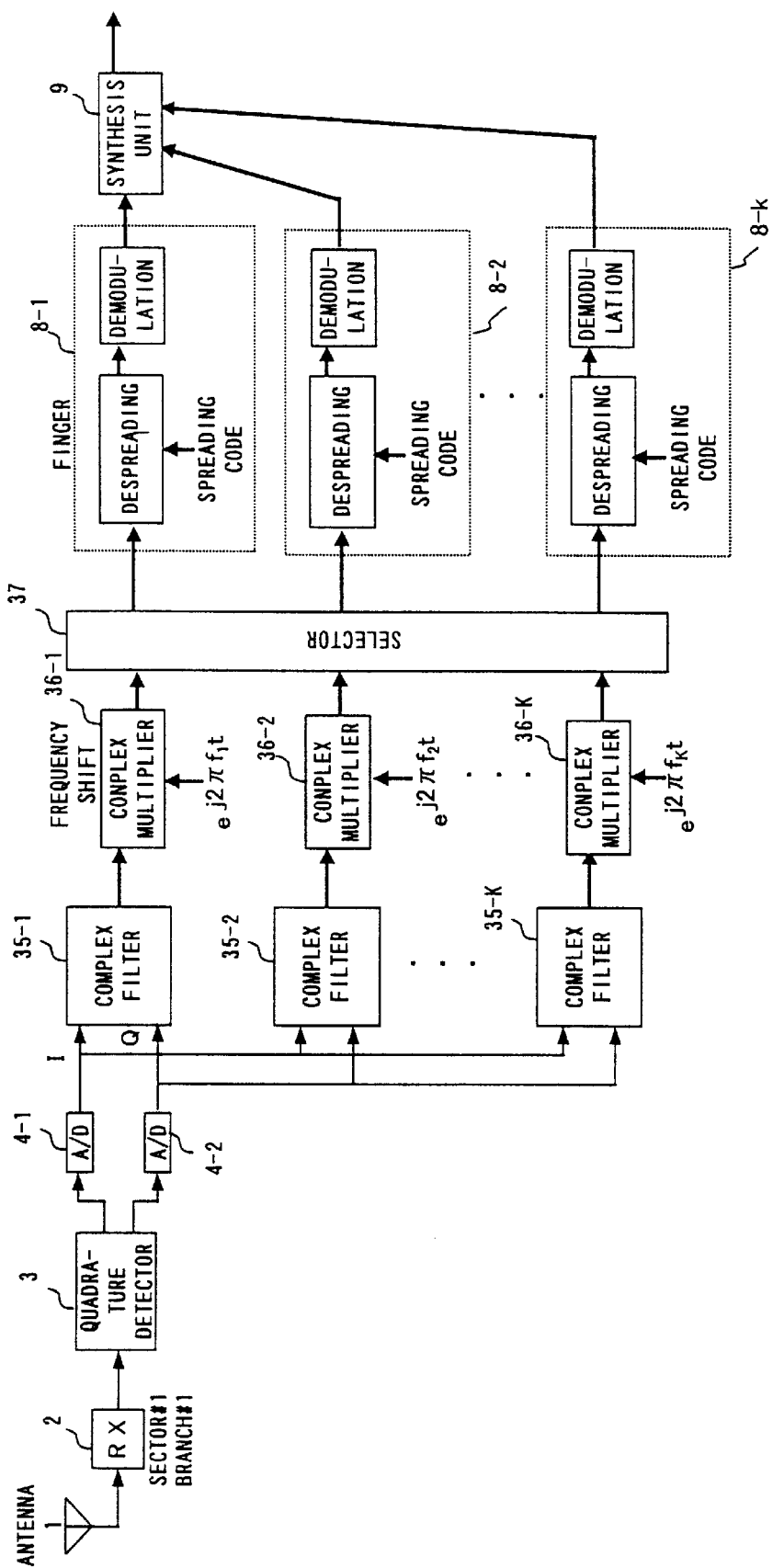
F I G. 7

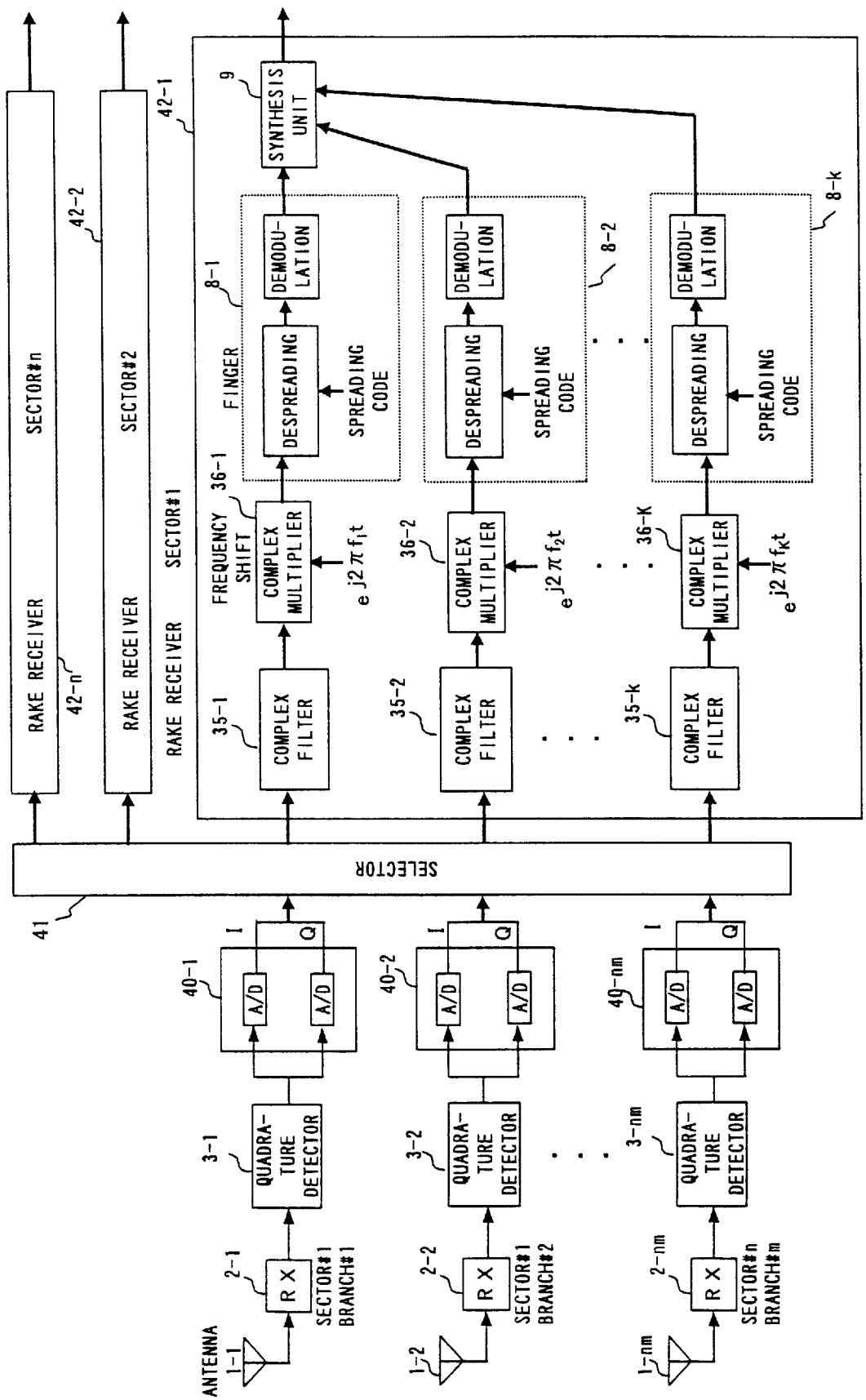
F I G. 8

RECEIVER AND RECEIVING METHOD IN MULTI-CARRIER SPREAD-SPECTRUM COMMUNICATIONS

BACKGROUND OF THE INVENTION

1. Field of the Invention

The present invention relates to a receiver and a method of receiving a multi-carrier CDMA signal.

2. Description of the Related Art

A code division multiple access (CDMA) system has been developed through direct sequence spread-spectrum modulation (DS-SS) as a mobile communications system in the coming generation. In the CDMA, signals of respective users in the same carrier are split using different codes and code-multiplexed. Then, the frequency band assigned to the system is used by frequency-multiplexing a plurality of code-multiplexed carrier signals. In this case, a receiving device at a base station has to demodulate CDMA signals of a plurality of signals.

FIG. 1 shows the configuration of the receiver of a conventional multi-carrier CDMA signal.

The configuration shown in FIG. 1 corresponds to one sector and one branch. Each carrier signal is received by a corresponding receiver (RX) 190 (190-1, 190-2, ..., 190-n), and is processed by filtering, despreading, and demodulation. In a base station by a cellular system, the capacity of the system can be increased using sectors. A sector can be obtained by dividing a cell covered by one base station into further smaller areas. If a cell is a circular area having a base station at the center, it can be radially divided into sections from the base station as the center. Each of the RXs arranged to each sector receives a multi-carrier signal. In the DS-SS receiver, a RAKE receiver is used for synthesizing a multipath. In the RAKE reception at a base station in the CDMA system, signals from a plurality of sectors are RAKE-synthesized so that a hand-over function of switching a sector can be realized without changing the connection when a mobile unit moves between sectors. In order to flexibly correspond to the fluctuation of traffic the mobile unit moving between sectors, the configuration of a system for processing despreading, demodulation, and RAKE-synthesis can be designed as sector-free. A sector-free system refers to a system capable of allowing a base station to process a signal of a mobile unit without considering its movement between sectors as if the mobile unit were in a sector even when it moves between sectors.

Described below are the configuration and operations of a receiver of conventional multi-carrier CDMA signals shown in FIG. 1.

In FIG. 1, signals received from an antenna 1900 are input to respective RXs 1901-1 through 1901-n. Then, they are multiplied by the periodical waves of the frequencies f1 through fn output from station oscillators 1902-1 through 1902-n, and converted into IF signals. After being band-limited by band pass filters 1904-1 through 1904-n, they are detected by quadrature detectors 1905-1 through 1905-n to generate I signals and Q signals. The I signals and Q signals are analog signals, converted into digital signals by A/D converters 1906-1 through 1906-n including an A/D converter 1906A for I signals and A/D converter 1906B for Q signals, and input to fingers 1908-1 through 1908-n through an interface 1907. In the fingers 1908-1 through 1908-n, the receives digital I and Q signals are despread by a despreader 1908A, demodulated by a demodulator 1908B, and output to a synthesis unit 1909. The synthesis unit 1909 RAKE-synthesizes a signal demodulated by each of the fingers 1908-1 through 1908-n, and transmits the signal to a signal discrimination unit (not shown in the attached drawings) described later.

(1) Problems with the Number of Interface Signal Lines

When the processes in and after the despreading process and the demodulating process are performed in a digital process, a signal received by each RX 1901 is A/D converted, and input as a digital signal to a base band processing unit 1911 through the interface 1907. To realize the sector-free configuration in the interface 1907, connections should be established such that all despreaders 1908A (fingers) can select signals from arbitrary sectors, branches (a plurality of independent receiving systems provided for diversity reception using an antenna), and carriers so that they can realize RAKE synthesis. Therefore, the interface 1907 between an RF unit 1910 and the base band processing unit 1911 requires the following number of signal lines.

Number of Signal Lines=number of sectors×number of branches× number of carriers×number of A/D bits×2 where '2' in the last term indicates the number of the lines of I and Q signals.

For example, assuming that the number of sectors is 6, the number of branches is 2, the number of carriers is 4, and the number of A/D bits is 8, the total number of signal lines is 768. Since the frequency of the digital signal obtained after the A/D conversion is high (for example, several ten MHz) in the W-CDMA, a high-speed and large-capacity bus interface 1907 is required, thereby interfering the realization of hardware.

(2) Problems in Responding to Multiple Chip Rates

In the CDMA system, a system using multiple chip rates is investigated as a method for flexibly accommodating information signals at various transmission rates. In this case, if each carrier signal is received by an individual RX 1901, it is necessary to provide the filter 1904, the despreader 1908A, and the demodulator 1908B exclusively for each chip rate.

SUMMARY OF THE INVENTION

The present invention aims at providing a circuit configuration requiring a simple and small volume of hardware, and capable of easily responding to multiple chip rates in the receiver of multi-carrier spread-spectrum communications.

The receiver according to the present invention demodulates a spread-spectrum signal modulated into a plurality of carrier frequencies, and includes a detection unit for collectively converting signals obtained by multiplexing multichannel carrier signals into a multiplexed signal of a predetermined frequency band; a carrier demultiplexing unit for performing a carrier demultiplexing process and a frequency shifting process on a signal obtained by the detection unit; and a despreading demodulation unit for performing a despreading process and a demodulating process on a base band signal of each channel obtained in the demultiplexing process and the frequency shifting process.

The receiving method according to the present invention demodulates a spread-spectrum signal modulated into a plurality of carrier frequencies, and includes the steps of (a) collectively converting signals obtained by multiplexing multichannel carrier signals into a multiplexed signal of a predetermined frequency band; (b) performing a carrier demultiplexing process and a frequency shifting process on a signal obtained the step (a); and (c) performing a despreading process and a demodulating process on a base band signal of each channel obtained in the demultiplexing process and the frequency shifting process.

According to the present invention, signals on a plurality of carriers are simultaneously detected, and then a signal of each carrier is extracted later. As a result, the number of signal lines in the interface unit can be reduced between a circuit operating corresponding to an RF band up to the detection unit or a transmission speed of a signal in the IF band and a circuit operating corresponding to the chip rate or a symbol rate in and after the despreading demodulation unit.

Furthermore, since a plurality of carriers can be simultaneously detected and the detected signals can be distributed to a plurality of despreading demodulation units, a sector-free receiver can be easily designed according to the present invention.

BRIEF DESCRIPTION OF THE DRAWINGS

FIG. 4 is a block diagram according to the second embodiment of the present invention;

FIG. 7 is a block diagram according to the third embodiment of the present invention;

FIG. 8 is a block diagram according to the fourth embodiment of the present invention;

DESCRIPTION OF THE PREFERRED EMBODIMENTS

According to the embodiments of the present invention, a plurality of carrier signals are received by one RX. A received signal is converted into a complex narrow band signal by a quadrature detector, the in-phase and quadrature phase components are A/D converted, and are demultiplexed into respective carriers through a digital filter. Then, a despreading process and a demodulating process are performed on each of the demultiplexed signals.

According to another aspect of the present embodiment, a received signal is orthogonally detected by an A/D converter when the A/D conversion is performed using the under-sampling technology. At this time, the sampling value is converted into an in-phase and quadrature phase components, and demultiplexed into different carriers by the digital filter. Then, the despreading and demodulating processes are performed on each of the demultiplexed signals. In this case, the demodulated carriers and a chip rate depend on the tap coefficient of the digital filter used as a reception filter (carrier demultiplexing filter) and an integral time of the despreader.

Since the number of interface signal lines does not depend on the number of carriers according to the present embodiment, it can be reduced as follows.

Number of Signal Lines=number of sectors×number of branches× number of A/D bits×2

According to another aspect of the present embodiment, the number of signal lines is computed as follows because the interface does not cover a complex base band.

Number of Signal Lines=number of sectors×number of branches× number of A/D bits

For example, when the number of sectors is 6, the number branches is 2, the number of carriers is 4, and the number of A/D bits is 8, the number of interface signal lines can be reduced to 192 in the former case, and 96 in the latter case.

Since the chip rate of a demodulation signal can be selected by switching the digital process of a base band according to the present embodiment, one hardware unit can flexibly process a plurality of chip rates.

Figure 2:
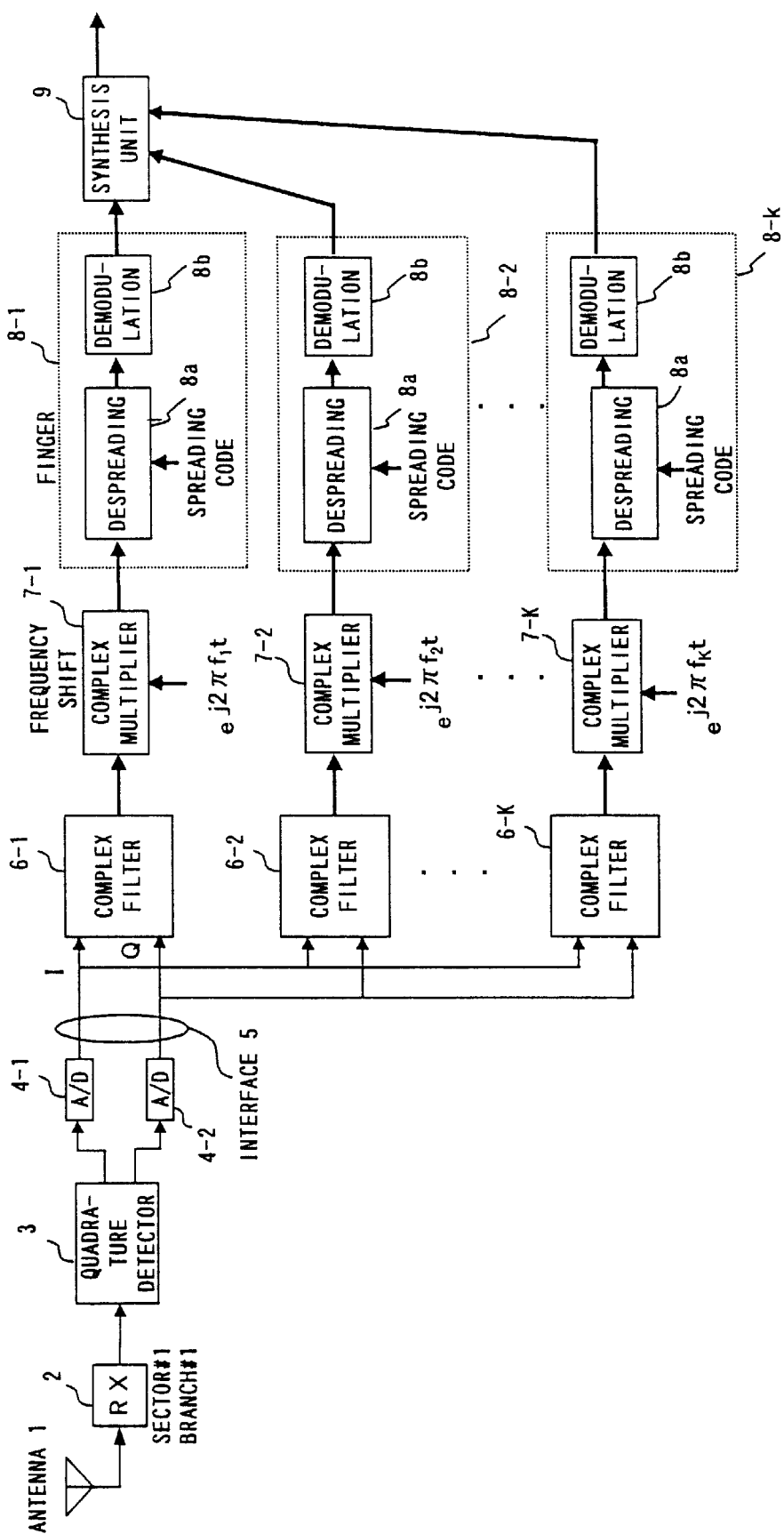
FIG. 2 is a block diagram according to the first embodiment of the present invention.

FIG. 2 is a block diagram according to the first embodiment of the present invention.

The configuration shown in FIG. 2 corresponds to one sector and one branch. A signal obtained by multiplexing a plurality of carriers and received at an antenna 1 is received by an RX 2, and input to a quadrature detector 3. The quadrature detector 3 converts a signal obtained by multiplexing a plurality of carriers into a complex narrow band signal (I signal and Q signal) by quadrature detection. Then, the obtained in-phase and quadrature phase components (I signal component and Q signal component) are A/D converted by A/D converters 4-1 and 4-2, and input to complex filters 6-1 through 6-k. Each of the complex filters 6-1 through 6-k comprises a FIR (finite impulse response) filter having a tap coefficient of a complex number, and has a filter characteristic of asymmetry about positive and negative frequencies.

The complex filters 6-1 through 6-k demultiplexes a specified carrier signal from a received multi-carrier signal. In the system in which a roll-off characteristic is satisfied in a transmission/reception band limit, it is desired that a carrier demultiplexing filter also has the function of a reception root roll-off filter. A single demultiplexed carrier signal is processed with a frequency shift in complex multipliers 7-1 through 7-k, and converted into a complex base band signal. That is, the center frequency of the specified complex carrier signal extracted by the complex filters 6-1 through 6-k is not 0 Hz. That is, the signal is not a base band signal. Accordingly, it is frequency-converted by the complex multipliers 7-1 through 7-k into a base band signal at the center frequency of 0 Hz. The obtained complex base band signal is multiplexed by a corresponding spreading code by a despreader 8a of fingers 8-1 through 8-k at an appropriate timing, and then integrated for despreading. A specified signal is extracted as a symbol by the despreading, and an interference signal is suppressed down to 1/(spreading rate). Demodulators 8b of the fingers 8-1 through 8-k detects the synchronization or the delay of the complex symbol obtained through the despreading, and a synthesis unit 9 synthesizes the detected output from a plurality of demodulators 8b. A RAKE receiver is designed as described above.

The synthesis unit 9 synthesizes the output by adding a signal from each of the fingers 8-1 through 8-k with an appropriate weight. For example, a maximum ratio synthesis can be realized. A weighting coefficient can be determined by power of the output from the fingers 8-1 through 8-k, the signal-to-interference power ratio (S/(I+N)), etc.

Figure 3:
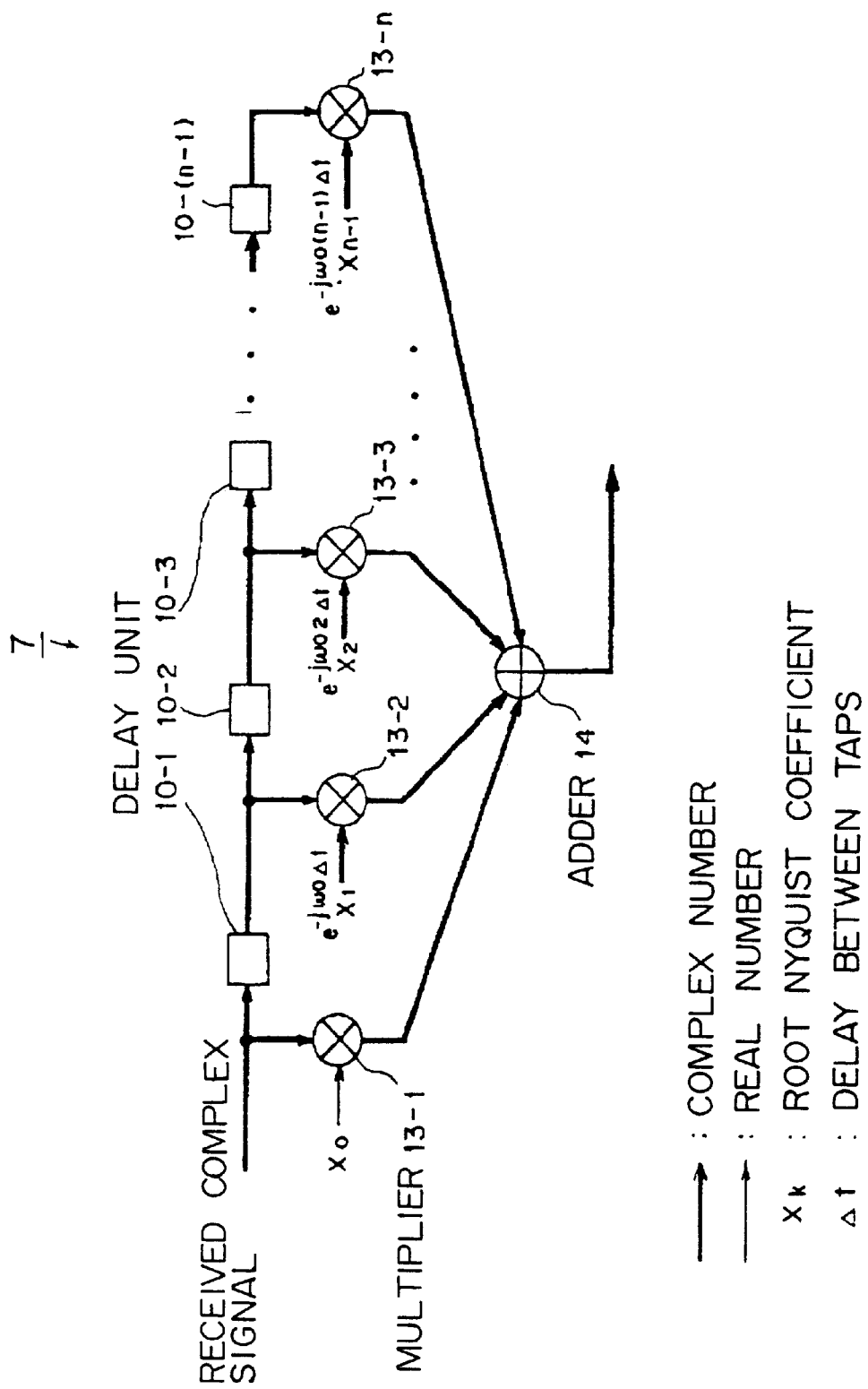
FIG. 3 is a block diagram of an example of a configuration of a complex filter.

FIG. 3 is a block diagram of an example of the configuration of complex filters 7 (7-1 through 7-k) shown in FIG. 2.

The received complex signal to be input contains an I signal which is a real number part of a complex envelope of a modulation wave obtained by quadrature modulation, and a Q signal which is an imaginary part. A complex signal refers to a combination of the I signal and the Q signal. Therefore, in FIG. 3, the unit into which a complex number is input or the signal line through which it is transmitted is divided into an I signal portion and a Q signal portion. In this case, if the I signal and the Q signal are processed with a complex coefficient in an arithmetic operation, then the I signal and the Q signal are assumed to be a real number component and an imaginary number component respectively to establish a circuit for a complex operation. A complex signal has the above described meaning which should be taken into account when a complex signal, a complex coefficient, etc. appear in the descriptions below.

A received complex signal is first input to a multiplier 13-1, multiplied by a real coefficient x0, and input to the adder 14. Simultaneously, the received complex signal is input to a delay unit 10-1, and output from the delay unit 10-1 with the delay by a predetermined time Δt. A complex signal output from the delay unit 10-1 is input to a multiplier 13-2, and multiplied by a complex coefficient x1·exp(jω0Δt) in the multiplier 13-2. In this equation, ω0 indicates the center frequency of the signal to be extracted and represented by an angular frequency. For example, a complex filter 7-1 indicates ω0=2πf1. The multiplication result from the multiplier 13-2 is input to an adder 14. The output from the delay unit 10-1 is input to a delay unit 10-2, and output from the delay unit 10-2 again with the delay by the predetermined time Δt. The output from the delay unit 10-2 is input to a multiplier 13-3 and multiplied by a complex coefficient x2·exp(jω0·2Δt). The multiplication result is input to the adder 14. Furthermore, the output from the delay unit 10-2 is input to a delay unit 10-3, and similarly delayed by the delay unit 10-3. The process is performed by an arbitrary number n of taps, the multiplication results from the multipliers 13-1 through 13-n are added by the adder 14, and the sum is output from the complex filter 7.

In the complex filter 7 shown in FIG. 3, ω0 specifies the center frequency of a signal to be extracted. x0 through xn−1 determine the transmission characteristic of the complex filter 7, and are the root Nyquist coefficients.

FIG. 4 is a block diagram according to the second embodiment of the present invention.

Figure 1:
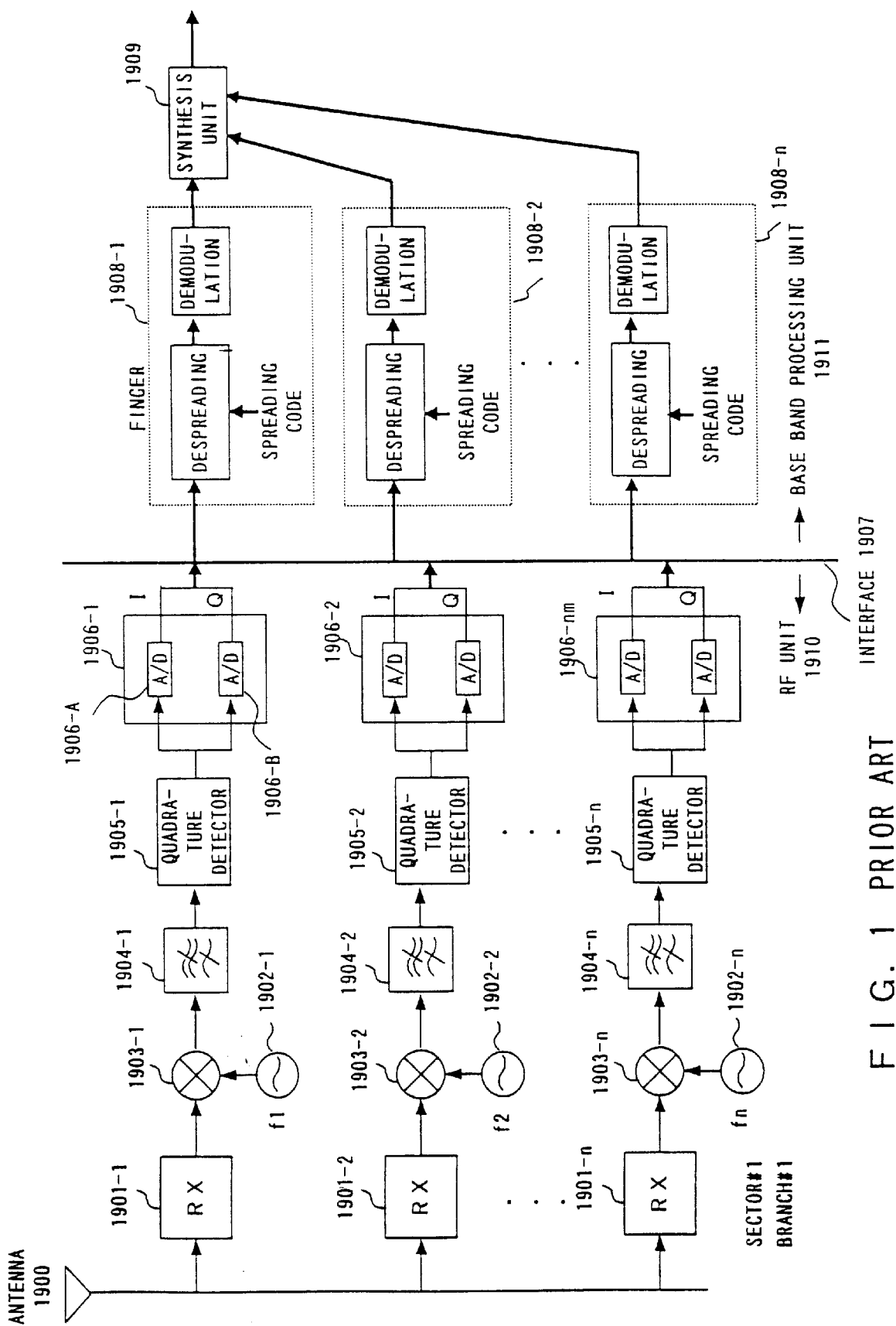
FIG. 1 shows the configuration of the conventional multi-carrier CDMA signal receiver.

In FIG. 4, the components also shown in FIG. 1 are assigned the same reference numbers.

The configuration shown in FIG. 4 corresponds to one sector and one branch. The difference from the above described first embodiment resides in the method of designing a filter. According to the present embodiment, a carrier to be extracted is frequency-shifted to the base band (center frequency is 0 Hz) from the complex signal in which complex carriers are frequency-multiplexed. The frequency shift can be realized by complex-multiplying the phase rotation corresponding to the amount of the frequency shift by an input signal for each sampling period. Next, a filtering process is performed using a filter on a complex signal in which the center frequency is set at 0 Hz. The filter is a digital filter of a real number tap, and has the characteristic of symmetry about positive and negative frequencies. After the filtering process, the single-carrier base band signal is despread, detected, and synthesized. The RAKE receiver is designed as described above.

The above described operations are explained below in detail by referring to FIG. 4. First, a signal received by the antenna 1 is received by the RX 2, and input to the quadrature detector 3. The I signal and the Q signal generated by the quadrature detector 3 are converted into digital signals by the A/D converters 4-1 and 4-2 respectively, and input as complex signals to complex multipliers 20-1 through 20-k through an interface 22.

The complex multipliers 20-1 through 20-k frequency-shift an input complex signal using the frequency $f_1$ through $f_k$ of the carrier of a signal to be extracted. The complex signals frequency-shifted by the complex multipliers 20-1 through 20-k are input to filters 21-1 through 21-k, and a signal on a desired carrier can be extracted through the filters 21-1 through 21-k. A signal on the extracted carrier is input to the fingers 8-1 through 8-k, processed by despreading and demodulation, and synthesized by the synthesis unit 9 and then RAKE-received.

Figure 5:
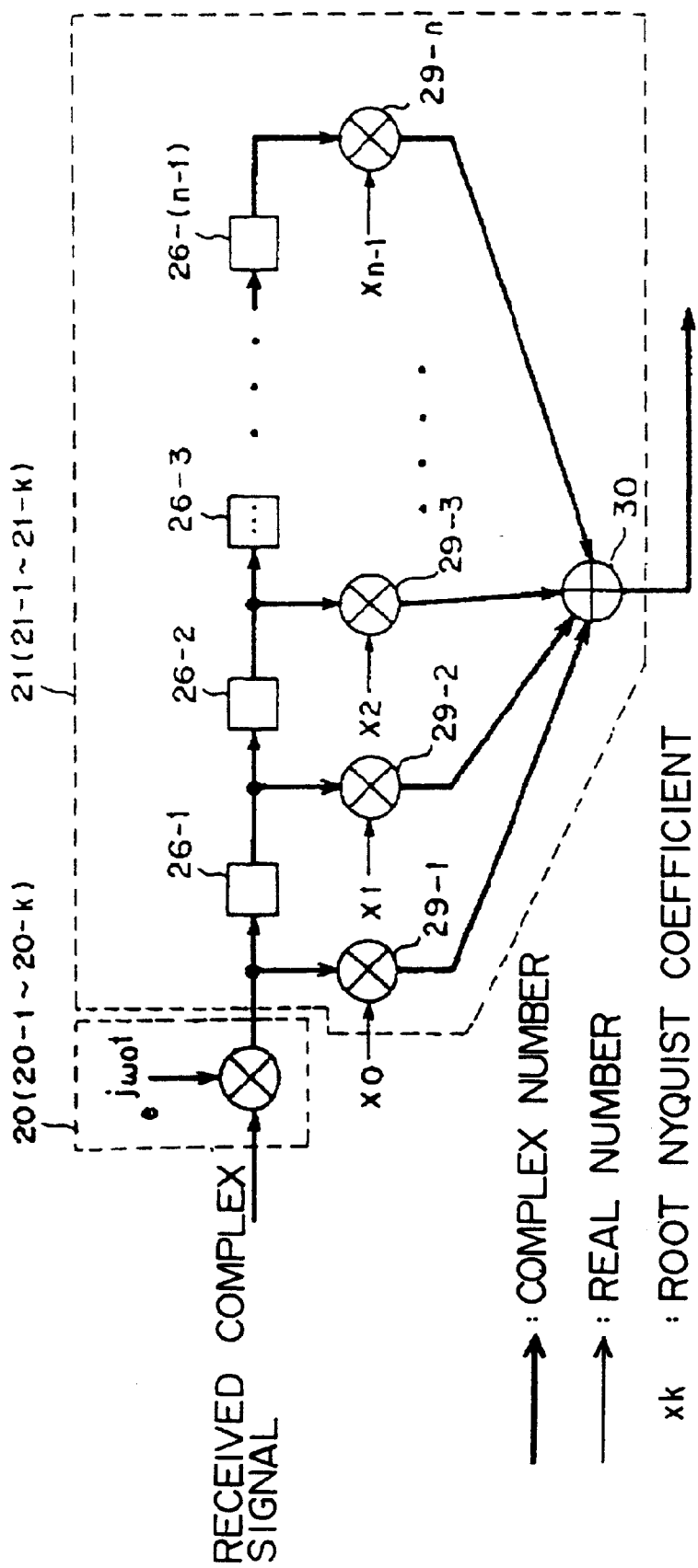
FIG. 5 is a block diagram of an example of a configuration for a frequency shift and an example of a configuration of a real-number filter according to the second embodiment of the present invention.

FIG. 5 is a block diagram of an example of the configuration for a frequency shift, and an example of the configuration of a real number filter according to the second embodiment of the present invention.

An input received complex signal is multiplied by a frequency having the angular frequency ω0 corresponding to the frequency of the carrier to be extracted by a multiplier 25, and then frequency-shifted. After received complex signals have been frequency-shifted, they are input to multipliers 29-1 through 29-n while being delayed by delay units 26-1 through 26-(n−1). After the received complex signals have been delayed by the delay units 26-1 through 26-(n−1), they are multiplied by the root Nyquist coefficient x1, x2, . . . , xn−1 in the multipliers 29-1 through 29-n. The received complex signal output from the multiplier 25 is multiplied by the root Nyquist coefficient x0 in the multiplier 29-1. According to the second embodiment of the present invention, the tap coefficients (root Nyquist coefficients) x1, x2, . . . , xn input to the multipliers 29-1 through 29-n are real numbers, and the multipliers 29-1 through 29-n multiply a complex number by a real number. The multiplication result is input to an adder 30, and output as an output from the filters 21 (21-1 through 21-k). Thus, a signal having a carrier to be extracted can be extracted.

Figure 6:
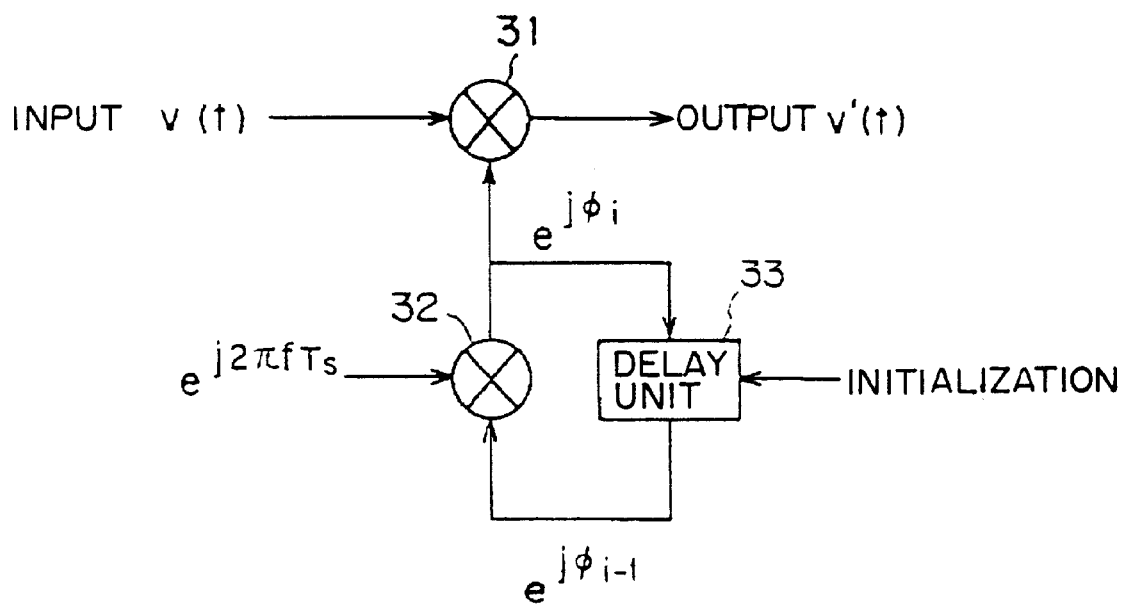
FIG. 6 is a block diagram of an example of a configuration of the frequency shift unit.

FIG. 6 is a block diagram of an example of the configuration of a frequency shift unit corresponding to the complex multipliers 20 (20-1 through 20-k).

Assuming that a received complex signal to be frequency-shifted is v(t), a frequency-shifted signal is v'(t), and the frequency to be shifted is f, then the following equation is set.

$$v'(t)=v(t)\exp(j2\pi ft) \qquad (1)$$

If a sampling period of a received signal is $T_s$, then the frequency shift corresponding to the discrete sample value is given by the following equation (i is a natural number).

$$v'(iT_s)=v(iT_s)\exp(j\phi_i) \qquad (2)$$

$$\exp(j\phi_i)=\exp(j\phi_{i-1})\exp(j2\pi fT_s) \qquad (3)$$

where $\exp((j\phi_0)=1$, that is, $\phi_o=0$.

The operation by equation (2) is performed by a multiplier 31.

The amount of phase rotation $\exp(j\phi_i)$ obtained by equation (3) is generated by a loop circuit of a complex multiplier 32 and a delay unit 33 as shown in FIG. 5, and the result is input to the multiplier 31. To prevent an increase of an error generated by repeating a phase rotation operation at a finite precision, the value of the delay unit 33 is initialized on a cycle of $\phi_i=2n\pi$ (n is an integer).

For example, i=0 when the first signal is input as follows.

$$v'(O)=v(O)\exp(j\phi_o)=v(O)$$

Since the next signal is input after the sampling period $T_s$, the following equation results.

$$v'(T_s)=v(T_s)\exp(j\phi_1)=v(T_s)\exp(j(\phi_o+2\pi fT_s))=v(T_s)\exp(j2\pi fT_s)$$

Therefore, the equations (2) and (3) above are expressed as follows.

$$v'(iT_s)=v(iT_s)\exp(j2\pi f(iT_s))$$

The equation is a discrete expression of equation (1).

FIG. 6 is a block diagram according to the third embodiment of the present invention.

In FIG. 6, the component also shown in FIG. 4 is assigned the same reference number. The configuration shown in FIG. 6 corresponds to one sector and one branch.

According to the present embodiment, the output from a carrier demultiplexing filter is distributed to a despreading demodulator (finger) through a selector. The selector switches a filter output with a finger input so that each finger can perform inverse spreading demodulation on a signal of an optional sector, branch, and carrier. Normally, a filter output from one system is distributed to a plurality of fingers.

The above described operations are described below by referring to FIG. 7. First, a received signal received by the antenna 1 is then received by the RX 2, and is then detected by the quadrature detector 3 to generate an I signal and a Q signal. The I signal and the Q signal is converted into a digital signal by the A/D converters 4-1 and 4-2, and input to a plurality of complex filters 35-1 through 35-k. Then a signal having a desired carrier is extracted by the complex filters 35-1 through 35-k. Signals of the detected carriers are frequency-shifted by complex multipliers 36-1 through 36-k, and converted into base band signals. Thus, the received signal of each carrier is converted into a base band signal is input to a selector 37 from the complex multipliers 36-1 through 36-k. The selector 37 assigns a signal of each channel (carrier) to each of the fingers 8-1 through 8-k, and processes each signal in a despreading operation and a demodulating operation. Then, the synthesis unit 9 synthesizes signals output from each of the fingers 8-1 through 8-k for RAKE reception.

In the example shown in FIG. 7, the selector 37 assigns a signal of one sector and one branch to the fingers 8-1 through 8-k. However, a selector corresponding to a plurality of sectors and a plurality of branches can be provided so that a frequency-shifted signal of each channel of a RAKE receiver with the configuration of a signal for each branch of each sector as shown in FIG. 7 can be assigned to an appropriate finger by the selector, thereby inputting signals from two selectors to one synthesis unit 9 for RAKE reception when a mobile unit is moving between sectors, etc. As a result, a sector-free receiver can be realized. The operations of the selector 37 are described later.

FIG. 8 is a block diagram according to the fourth embodiment of the present invention.

In FIG. 8, the components also shown in FIG. 7 are assigned the same reference numbers.

In the present embodiment, a received signal from each sector and each branch is connected to an input terminal of a carrier demultiplexing complex filter or a frequency shifter (complex multiplier) through a selector. The selector switches the connection between the output of each A/D converter and the input of each complex filter, or between the output of each A/D converter and the input of a frequency shifter so that each finger can perform a despreading demodulation process on a signal of an optional sector and an optional branch.

That is, according to the present embodiment, a received signal from an optional sector and an optional branch can be RAKE-received. In FIG. 8, an antenna 1-1 corresponds to a sector #1 and a branch #1, an antenna 1-2 corresponds to the sector #1 and a branch #2, and an antenna 1-nm corresponds to a sector #n and a branch #m. Although not shown in FIG. 8, an antenna is provided for each of the branches #1 through #m of each of the sectors #1 through #n. A signal received by any of the antennas 1-1 through 1-nm is received by RX2-1 through 2-nm. The quadrature detectors 3-1 through 3-nm generate an I signal and a Q signal of each signal. The I signal and the Q signal from each branch are converted into digital signals by A/D converters 40-1 through 40-nm, and input to a selector 41. A RAKE receiver 42 (42-1 through 42-n) of each sector is connected to the selector 41. The configurations of the n RAKE receivers 42-1 through 42-n of the RAKE receiver for the sectors #1 through #n are basically the same. However, the frequency of a periodic wave and the despreading code used in the frequency shifting process are appropriately selected.

The selector 41 outputs a received complex signal comprising input I and Q signals to the RAKE receivers 42 for each sector. At this time, from which branch a complex narrow band signal is to be selected is determined according to the quality information about the received signal obtained from the interference power measurement device, etc. not shown in the attached drawings. A received signal from a branch is input to the RAKE receiver 42. The received signal is obtained by multiplexing the signals transmitted on a plurality of carriers. Therefore, when signals are RAKE-received, a signal corresponding to a specified carrier is extracted from the multiplexed signal for despreading.

In each of the RAKE receivers 42, the complex filters 35-1 through 35-k extract a signal of each carrier as described according to the first embodiment. However, in this case, the center frequency of a carrier is not shifted to 0 Hz, the center frequency is not in position even after a narrow band signal is obtained. A signal corresponding to each carrier extracted by the complex filters 35-1 through 35-k is frequency-shifted by the complex multipliers 36-1 through 36-k, the center frequency is set in position, and the signal is converted into a base band signal to be obtained. Thus, an extracted signal corresponding to each carrier is despread and demodulated by the fingers 8-1 through 8-k, synthesized by the synthesis unit 9, and then RAKE received.

In FIG. 8, the RAKE receiver 42 is provided for each sector. However, when a mobile unit is handed over between sectors, the RAKE reception is performed by inputting a signal from the sector #1 and a signal from the sector #2 to the RAKE receiver 42-1 for the sector #1, thereby realizing the sector-free reception.

Figure 9:
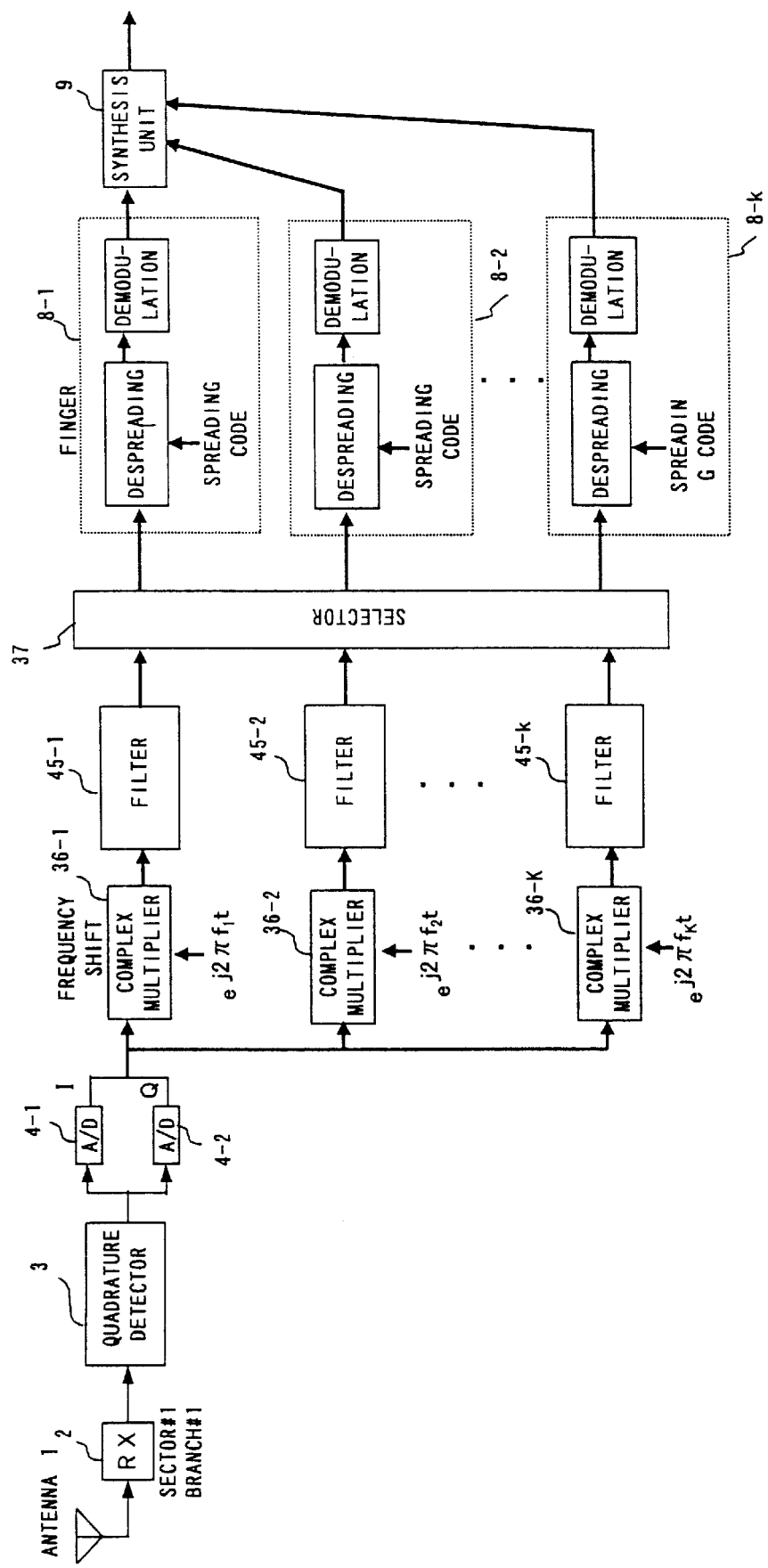
FIG. 9 is a block diagram according to the fifth embodiment of the present invention.

FIG. 9 is a block diagram according to the fifth embodiment of the present invention.

In FIG. 9, the components also shown in FIG. 7 are assigned the same reference numbers.

According to the present embodiment, an output from a carrier demultiplexing filter is distributed to a despreading demodulator (finger) through a selector. The selector switching-connects the output of a filter to the input of a finger such that each finger can despread and demodulate a signal of any sector, branch, or carrier. Normally, a filter output from one system is distributed to a plurality of fingers.

In FIG. 9, a signal received by the antenna 1 contains a plurality of carriers. The signal containing a plurality of carriers is received by the RX 2, and detected by the quadrature detector 3. An I signal and a Q signal obtained by the orthogonally detecting process are converted into digital signals respectively by the A/D converters 4-1 and 4-2. A pair of the I signal and the Q signal converted into digital signals are recognized and processed as one complex signal. The digitalized complex signal is input to the complex multipliers 36-1 through 36-k. The complex multipliers 36-1 through 36-k multiply the periodic wave corresponding to the frequency of a complex signal to be extracted by a complex signal for frequency shift. Thus, the center frequency is converted into a base band signal at 0 Hz by removing the frequency components of carriers not desired but contained in the signal obtained as a result of simultaneously detecting a plurality of carriers by the quadrature detector 3. The received signal is input to filters 45-1 through 45-k. The filters 45-1 through 45-k only have to be designed to extract a base band signal having the center frequency at 0 Hz, and, unlike the complex filter, it is not necessary to assign a carrier demultiplexing function to a filter itself.

The output from the filters 45-1 through 45-k is input to the selector 37, and is distributed to the fingers 8-1 through 8-k by the selector 37. FIG. 9 shows only the configuration of one sector and one branch. However, a RAKE receiver with a similar configuration is provided for all branches of all sectors. Since it is designed to input the output from the filters 45-1 through 45-k of the selector 37 of the RAKE receiver of all branches of all sectors, a signal of any sector and any branch can be input to any finger through the selector 37, thereby realizing a sector-free configuration.

Figure 10:
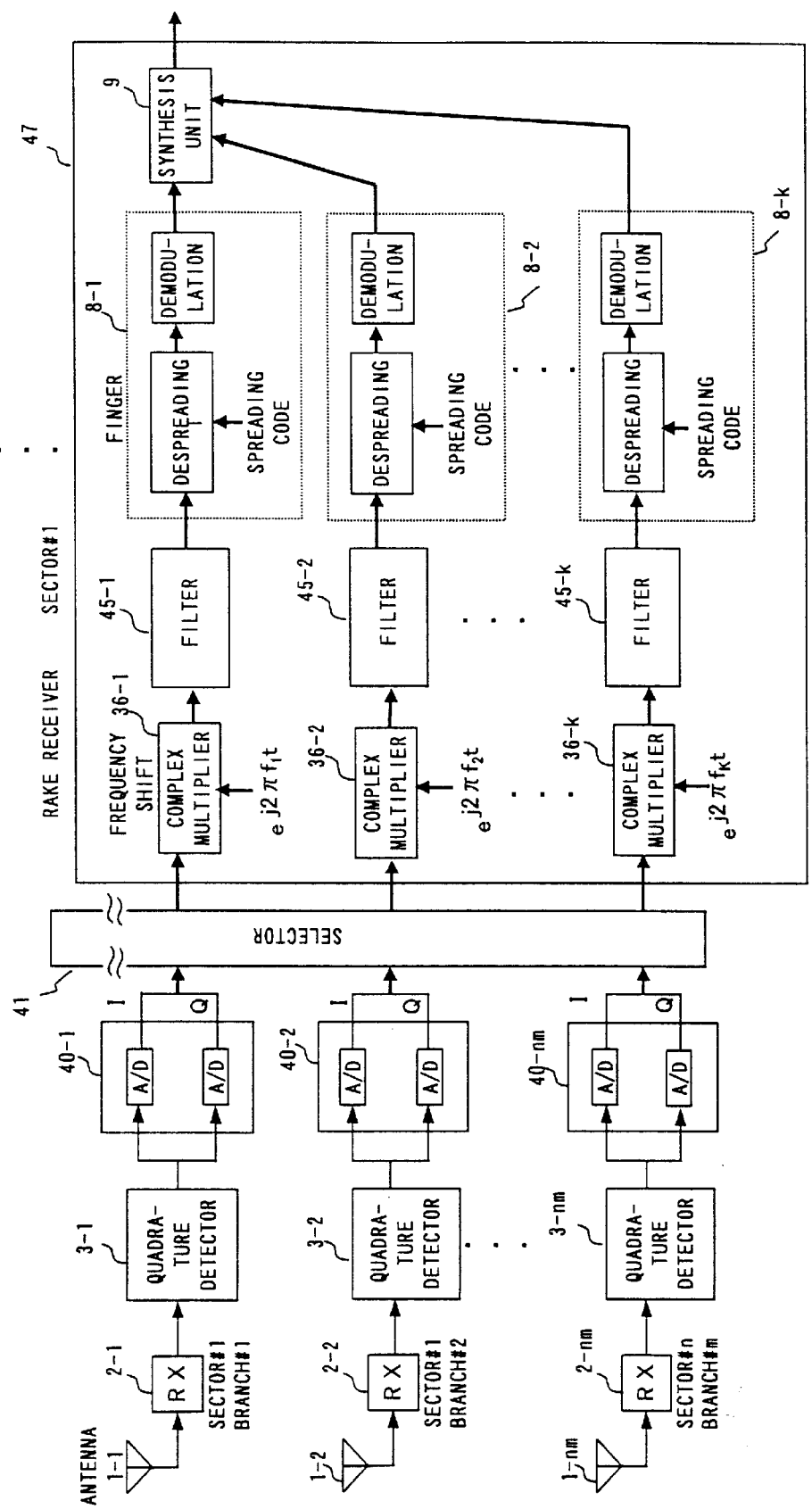
FIG. 10 is a block diagram according to the sixth embodiment of the present invention.

FIG. 10 is a block diagram according to the sixth embodiment of the present invention.

In FIG. 10, the components also shown in FIGS. 8 and 9 are assigned the same reference numbers.

According to the present embodiment, a received signal from each sector and each branch is connected to the input terminal of a frequency shifter through a selector. The output of a carrier demultiplexing filter is fixedly connected to one finger. The selector switching-connects the output of an A/D converter to the input of a complex filter, or the output of an A/D converter to the input of a frequency shifter such that each finger can despread and demodulate a signal of any sector and any branch.

Signals received by the antennas 1-1 through 1-nm are respectively received by the RXs 2-1 through 2-nm, and detected by the quadrature detectors 3-1 through 3-nm. The analog I and Q signals obtained by the orthogonally detecting process are converted into digital signals by the A/D converters 40-1 through 40-nm, and input as complex signals to the selector 41. The selector 41 outputs a received complex signal to a RAKE receiving unit 47 according to the positional information, etc. about a mobile unit provided by a system not shown in the attached drawings. In FIG. 10, the RAKE receiving unit 47 is provided for each sector for convenience, but it is not necessary that the RAKE receiving unit 47 is provided for each sector. A received complex signal can be input to any finger of the RAKE receiving unit only by switching the received complex signal such that a signal from one mobile unit can be RAKE-received by one RAKE receiving unit.

The received complex signal output from the selector 41 is input to the complex multipliers 36-1 through 36-k and frequency-shifted. By the frequency-shifting process, the center frequency of a specified received complex signal is shifted to 0 Hz of the base band signal. The desired received frequency-shifted complex signal is extracted by the filters 45-1 through 45-k, input to the fingers 8-1 through 8-k, and processed in the despreading and demodulating process. Then, the output from the fingers 8-1 through 8-k is synthesized by the synthesis unit 9, and then RAKE received.

Figure 11:
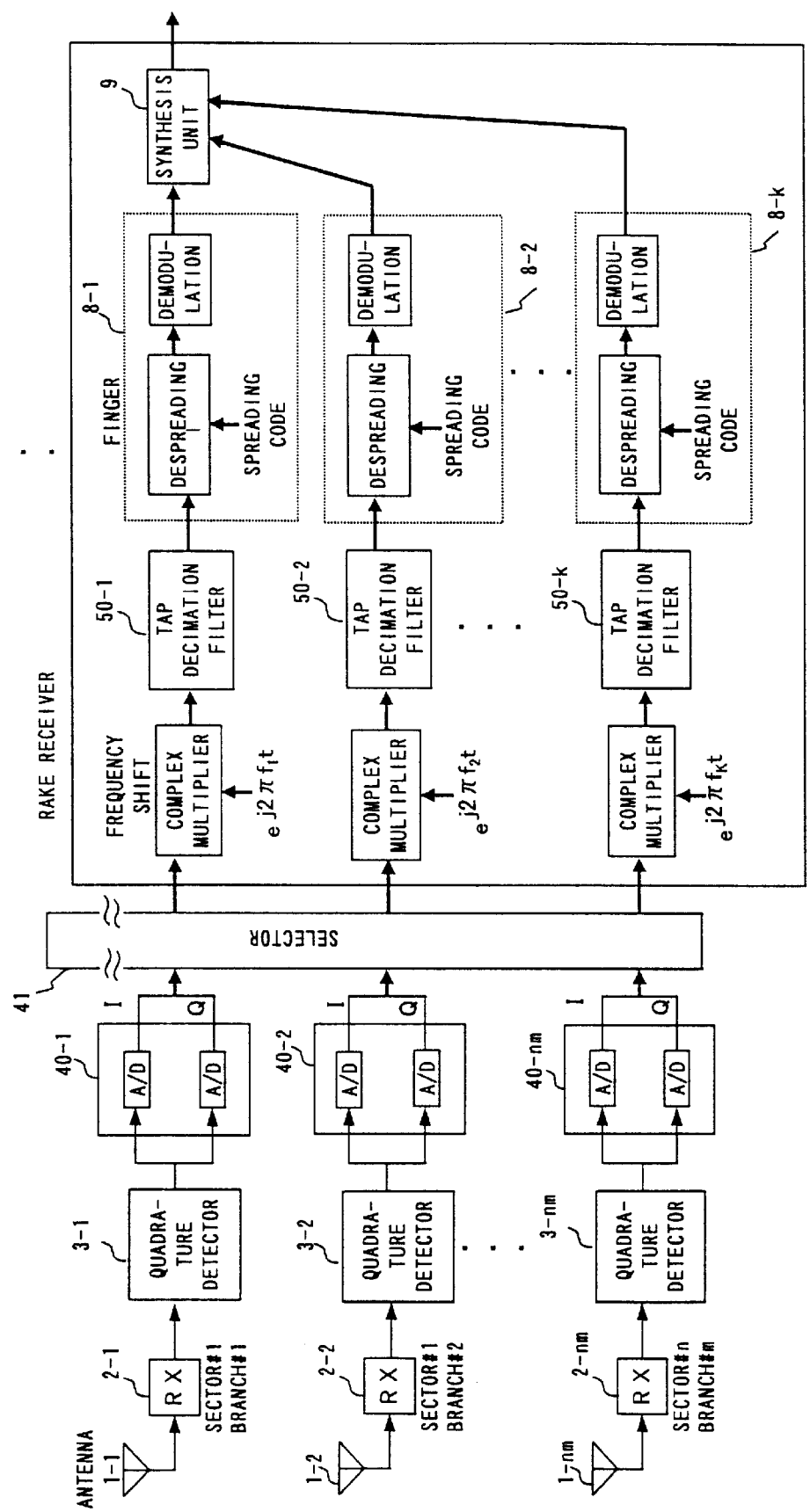
FIG. 11 is a block diagram according to the seventh embodiment of the present invention.

FIG. 11 is a block diagram according to the seventh embodiment of the present invention.

In FIG. 11, the components also shown in FIG. 10 are assigned the same reference numbers.

According to the present embodiment, only a sample value at a despreading timing of a path demodulated as an input signal of each finger is provided. Therefore, a carrier demultiplexing filter connected to a finger performs an operation of only the tap corresponding to a necessary sample timing from among taps obtained by multiplying a chip rate by an over-sample, thereby reducing the circuit scale. In addition, when a filtering operation is performed by a DSP (digital signal processor), etc., the amount of operations can be successfully reduced.

A signal received by the antennas 1-1 through 1-nm is received by the RXs 2-1 through 2-nm, and detected by the quadrature detectors 3-1 through 3-nm. An I signal and a Q signal generated by the orthogonally detecting process are converted into digital signals by the A/D converters 40-1 through 40-nm. The I and Q signals converted into digital signals are input to the selector 41 and input to an appropriate RAKE receiving unit. The RAKE receiving unit frequency-shifts the input complex signal by the complex multipliers 36-1 through 36-k, and converts the center frequency of the signal into a narrow band signal of 0 Hz. Then, the converted narrow band signal is input to tap decimation filters 50-1 through 50-k. The tap decimation filters 50-1 through 50-k eliminate a plurality of taps from normal FIR filters. Signals output from the tap decimation filters 50-1 through 50-k are input to the fingers 8-1 through 8-k, and despread and demodulated. As described above, since the signals output from the tap decimation filters 50-1 through 50-k are tap-eliminated, the characteristics of the filters are maintained, but the discrete ratio is reduced. However, no problems arise if the reduction effect matches the despreading timing.

The selector according to each of the embodiments shown in FIGS. 7 through 11 is connected to the input of each finger for RAKE synthesizing the received signal at a specified despreading timing in the following operations.

(1) Using a searcher (not shown in the attached drawings), a delay profile of a transmission path for a received specified signal of each sector or each branch is obtained. A delay profile is obtained as an over-sample signal computed by multiplying a chip rate by m.

(2) In consideration of the spread of the power generated by the band pass filter in the time domain, a signal from each path (each path of a multipath fading) is separated from the obtained delayed profile. Practically, for example, a process of masking a detected path before and after ±k sample is performed.

(3) The paths equal in number to the RAKE synthesized fingers are detected in order from the largest power or the highest S/N ratio.

(4) The received signal from the sector or branch containing the detected path is connected to the input of each finger by a selector.

(5) (thinning-out of taps) The filter operation timing and despreading timing are controlled according to the timing of each path to obtain a specified despreading signal.

(6) The procedures (1) through (5) are repeated for each path update period.

Figure 12:
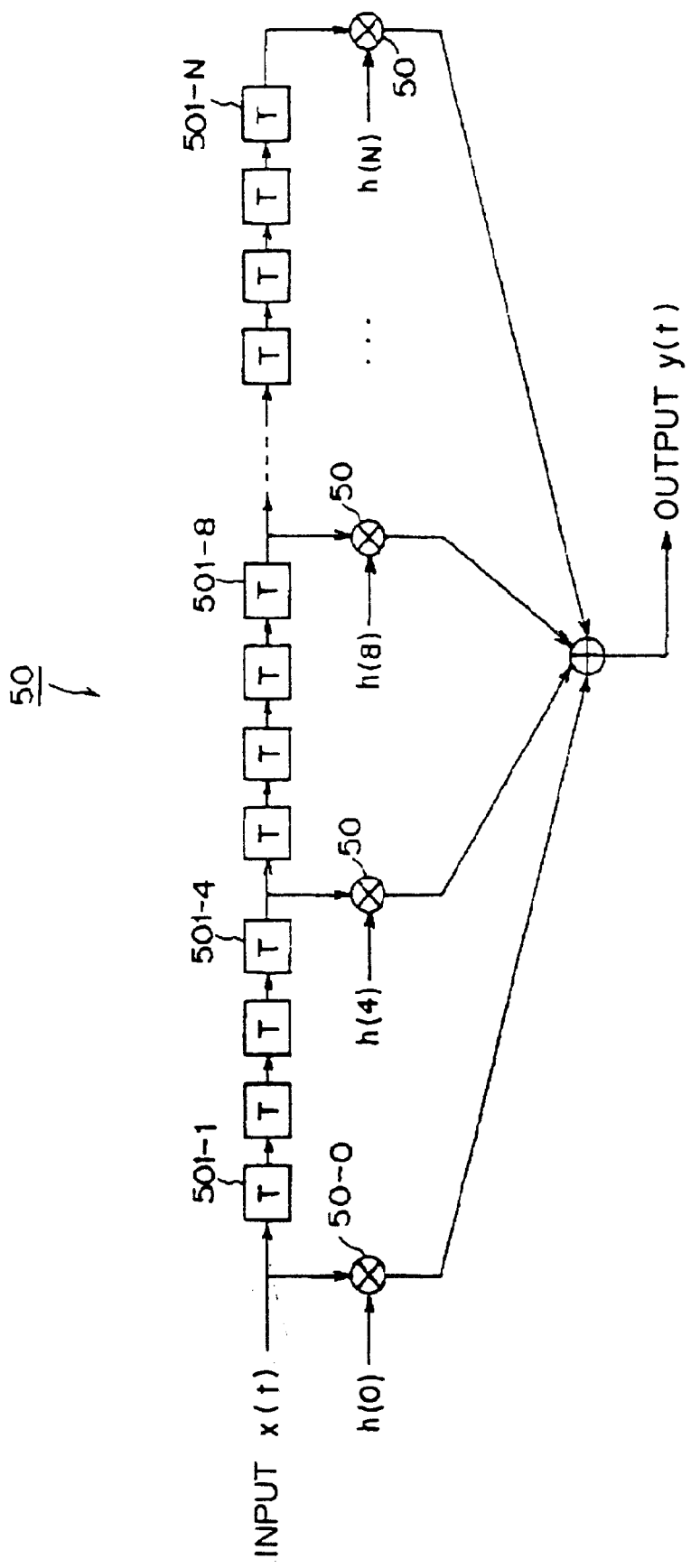
FIG. 12 is a block diagram of an example of a configuration of a tap decimation filter.

FIG. 12 is a block diagram of an example of the configuration of the tap decimation filters 50 (50-1 through 50-k).

The tap decimation filters 50 comprises a tap for retrieving the outputs from a plurality of delay units 501 (501-1 through 501-N) (in FIG. 12, indicated by the squares into which T is written, wherein T indicates a delay time) and predetermined delay units 501-4, 501-8, . . . , 501-N, and multiplying the input x(t) and the outputs from the delay unit 501-4, . . . , 501-N by the tap coefficient n(O), . . . , h(N); and an adder 505 for adding up the multiplication results. The addition result of the adder 505 is output as an output y(t). In FIG. 12, taps are provided for every fourth delay unit. The first tap inputs the input x(t) to the multiplier 503-0 without delay such that the input x(t) can be multiplied by the tap coefficient h(O). The delay time T of a delay unit is normally the sampling period of the A/D converters 40-1 through 40-nm. If the tap coefficients h(O) through h(N) are set as corresponding coefficient values in the tap coefficients of the case without decimation process, then the same filter characteristic is obtained as in the case with decimation. However, to prevent the loop-back of a frequency, the band of a filter input signal is limited to ¼ (as shown in FIG. 12). In the process of despreading each path at the subsequent stage, the process is performed at a speed lower than the sampling rate. Since all sampling values are not required in this despreading process, the decimation filter connected to each of the fingers 8-1 through 8-k only has to perform an operation corresponding to a necessary sampling timing, thereby reducing the circuit scale.

Figure 13:
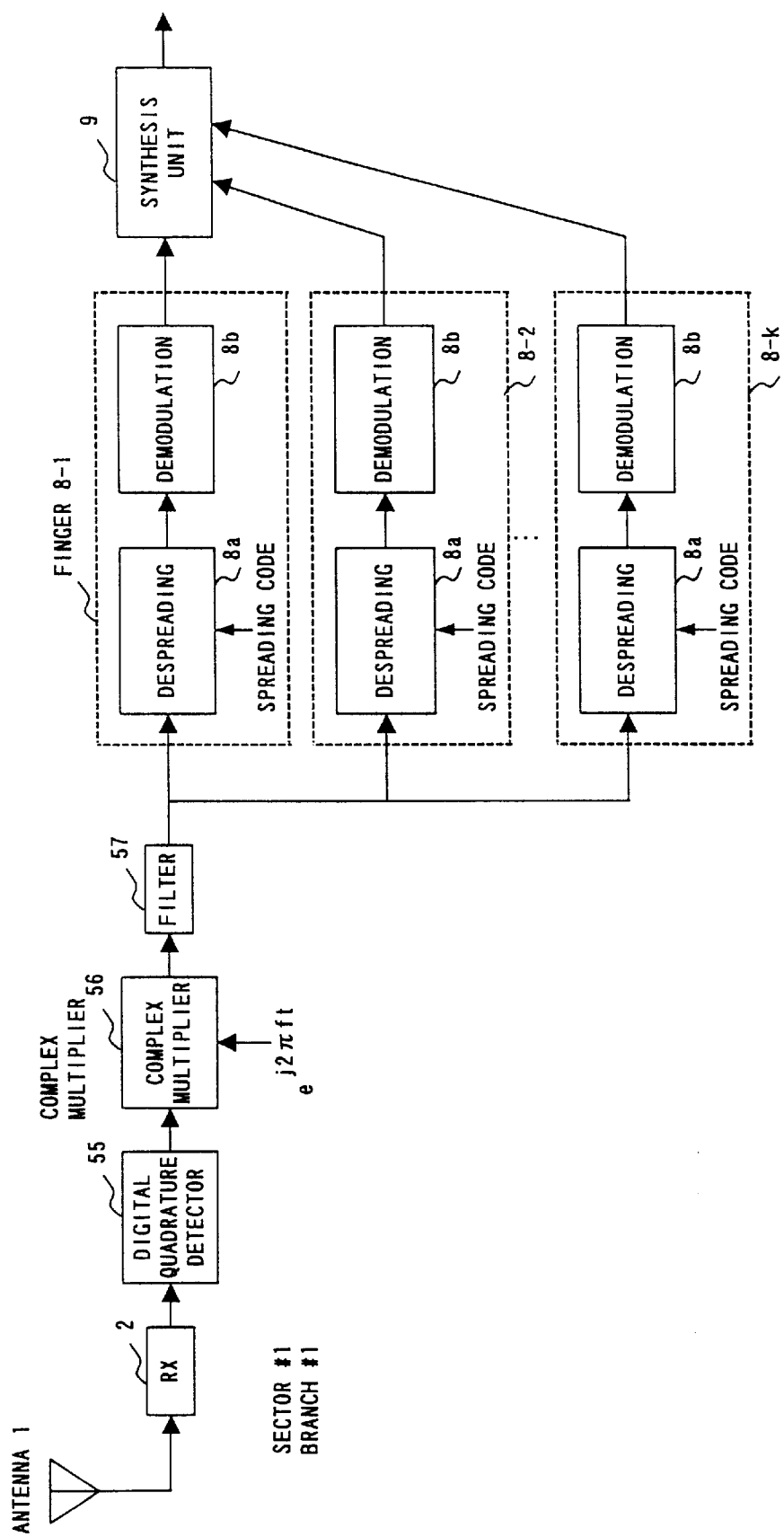
FIG. 13 is a block diagram according to the eighth embodiment of the present invention.

FIG. 13 is a block diagram according to the eighth embodiment of the present invention In FIG. 13, the components also shown in FIG. 2 are assigned the same reference numbers.

The configuration shown in FIG. 13 corresponds to one sector and one branch. When a plurality of sectors and a plurality of branches are to be covered, the number of the configurations shown in FIG. 13 should be equal to the number obtained by multiplying the number of sectors by the number of branches.

The signal received by the antenna 1 is received by the RX 2, and directly converted into an I signal and a Q signal of the digital signal of the IF band by a digital quadrature detector 55. After converting the received signal into an IF frequency, the digital quadrature detector 55 is sampled by an A/D converter (not shown in the attached drawings). At this time, the IF frequency $f_{IF}$ and the sampling frequency $f_{sample}$ are selected such that the condition of equation (4) below can be satisfied. Thereby, the quadrature demodulation is performed.

$$f_{sample}=4f_{IF}/(4m+1) \quad (4)$$

where m indicates an integer equal to or larger than 1.

The sample value obtained under the above described condition is output in the order of, for example, $v_I$, $v_Q$, $-v_I$, $-v_Q$, where $v_I$ indicates an in-phase component, and $v_Q$ indicates a quadrature phase component. Therefore, output sample sequences are divided into even number samples and odd number samples, and signs are alternately reversed. As a result, quadrature demodulation results $v_I$ and $v_Q$ can be obtained. The digital quadrature detector 55 is arranged before a carrier demultiplexing filter 57 or a frequency shifter 56 (in FIG. 13, the configuration includes the frequency shifter 56). With the configuration, the number of necessary signal lines for an interface can be reduced to ½ when compared with the method of separately converting a complex base band signal (I/Q) after the quadrature detection and connecting them to the base band processing unit as indicated in the first through seventh embodiments. However, with the present configuration, the signal speed of the interface is doubled.

The output of the digital quadrature detector 55 is frequency-shifted by the frequency shifter (complex multiplier) 56, and the center frequency of a specified signal is converted into 0 Hz. Then, only a signal transmitted on a specified carrier is extracted, and input to each of the fingers 8-1 through 8-k. The fingers 8-1 through 8-k despread and demodulate signals which are different in spreading timing and have been transmitted on the specified carrier, and input them to the synthesis unit 9. The synthesis unit 9 synthesizes a signal from each of the fingers 8-1 through 8-k to perform the RAKE receiving process.

Figure 14:
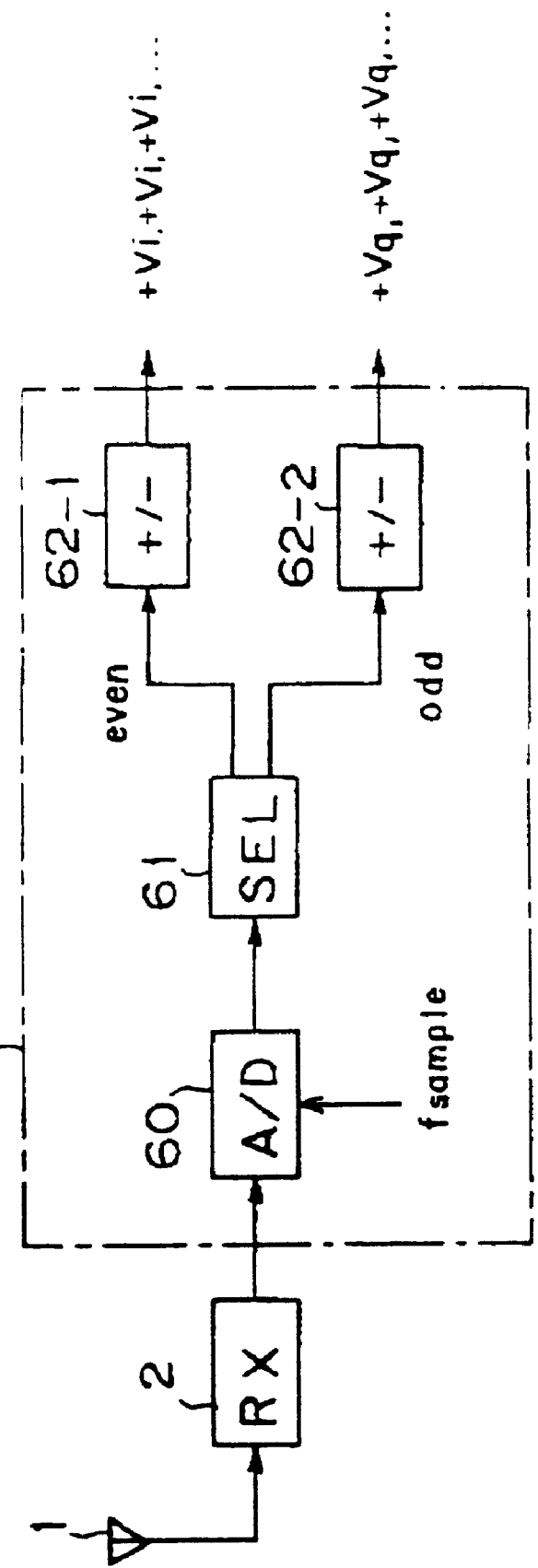
FIG. 14 is a block diagram of the configuration of the digital quadrature detector according to the embodiment shown in FIG. 13.

FIG. 14 is a block diagram of an example of the configuration of the digital quadrature detector 55 according to the embodiment shown in FIG. 13.

A signal received by the antenna 1 is received by the RX 2, and input to the digital quadrature detector 55 In the digital quadrature detector 55, the input signal is first sampled by the sampling frequency $f_{sample}$ determined by equation (4), and the discrete value is converted into a digital signal by an A/D converter 60. Digital signals sequentially output by the A/D converter 60 at a predetermined sampling rate are switched and output by a selector 61 with signals having even ordinary numbers as I signals and those having odd ordinary numbers as Q signals respectively to a sign converter 62-1 and a sign converter 62-2. There are in-phase components $v_I$ and $-v_I$ input to the sign converter 62-1. For the value $-v_I$, the sign converter 62-1 reverses and outputs the sign. For the value $v_I$, the sign converter 62-1 outputs it as is. There are quadrature components $v_Q$ and $-v_Q$ input to the sign converter 62-2. For the value $-v_Q$, the sign converter 62-2 reverses and outputs the sign. For the value $v_Q$, the sign converter 62-2 outputs it as is. By equation (4), the sampling frequency of the signal at the IF band from the RX 2 is set to the 4/5, 4/9, etc. of the frequency of the IF signal. Thus, when the sampling frequency is set, if the first sampling point (0-th point) matches the starting point of the cycle of the IF signal, then the first sampling value refers to the I signal. Since the next sampling point (first point) refers to one cycle of the IF signal, for example, the point of the 4/5 cycle, the signal of the phase of 90° on the second cycle of the IF signal is sampled. Therefore, the sampling value of the first point is refers to the Q signal. Thus, in the n-th sampling value, the phase of the IF signal is $(n+1)\pi/2$. However, it is assumed that the phase of the 0-th sampling is 0. In addition, n indicates 0 or natural numbers. A value sampled after the carrier of the IF signal has changed from positive to negative is a minus I signal ($-v_I$) or a minus Q signal ($-v_Q$). Since the IF frequency is higher than the frequency of the base band signal, a sampling rate is appropriately set using equation (4) such that the I and Q signals required to sample the band of a base band signal can be sampled.

The obtained I and Q signals of the base band are respectively input to the sign converters 62-1 and 62-2, and output after being appropriately converted by the sign converters 62-1 and 62-2.

Figure 15:
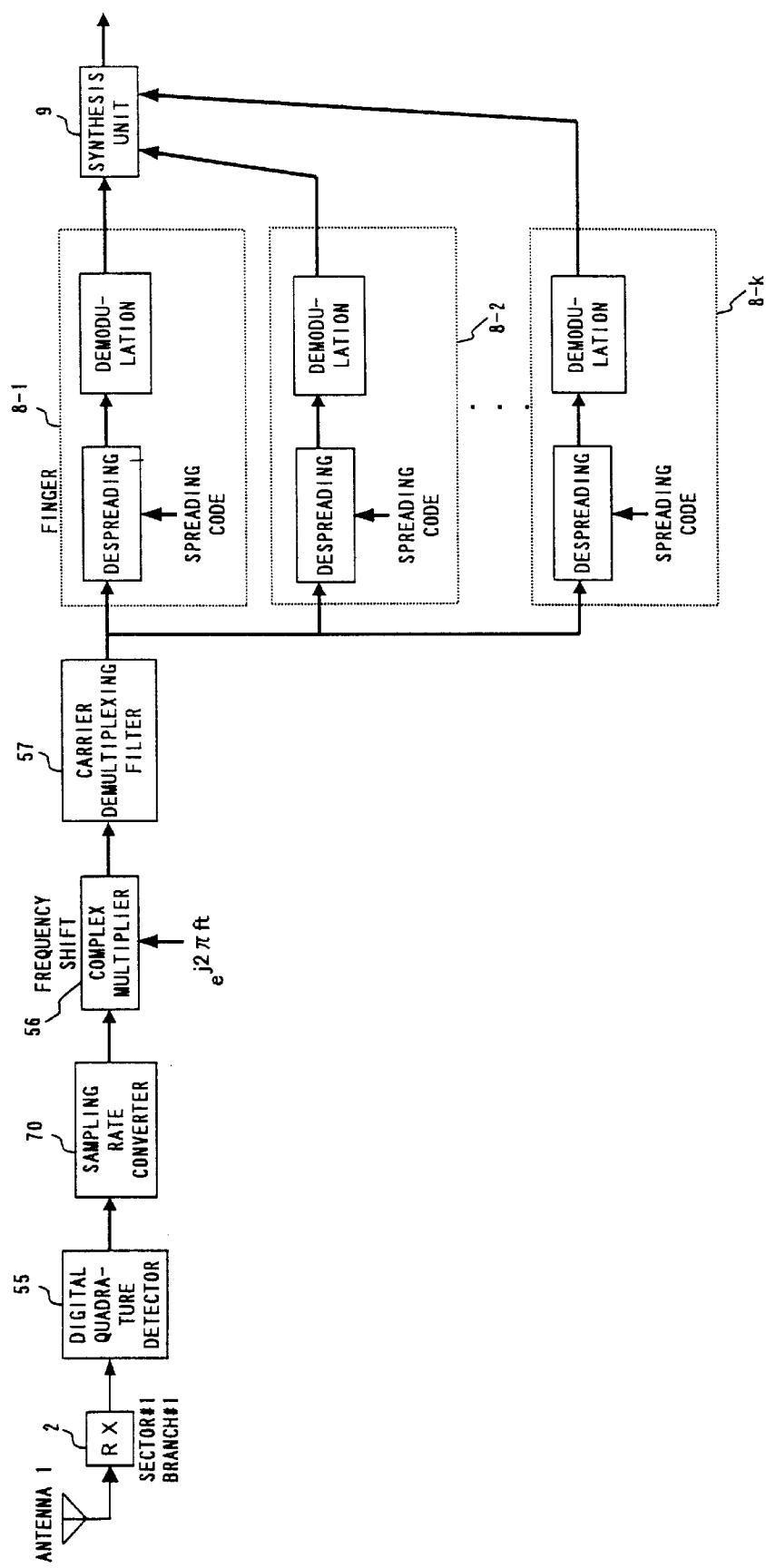
FIG. 15 is a block diagram according to the ninth embodiment of the present invention.

FIG. 15 is a block diagram according to the ninth embodiment of the present invention.

In FIG. 15, the components also shown in FIG. 13 are assigned the same numbers.

The output from the digital quadrature detector 55 according to the eighth embodiment is input to a sampling rate converter 70. The sampling rate converter 70 for converting the information speed of the digital signal by multiplying m/n comprises: an interpolator for inserting m−1 0s between input sample values; a filter for removing an alias from the output of the interpolator; and a decimeter for retrieving a necessary value of a sampling timing at every n-th sample from the sample string of the filter output. The m/n sampling rate converter 70 converts the digital signal having the sampling speed $f_{sample}/2$ obtained as an orthogonal output of the digital quadrature detector 55 into the sampling speed of the chip rate or the value obtained by multiplying the chip rate by an integer. Then, a signal obtained by the sampling rate converter 70 at a chip rate or the value obtained by multiplying the chip rate by an integer is input to the channel-demultiplexing complex filter 6 according to the first embodiment or the complex multiplier 20 which is a frequency shifting unit according to the second embodiment.

In FIG. 15, the signal received by the antenna 1 is received by the RX 2, and converted into an IF signal. Then, it is detected by the digital quadrature detector 55. The rate of the complex signal output from the digital quadrature detector 55 is ½ of the sampling rate $f_{sample}$ of the A/D converter 60 of the digital quadrature detector 55. However, the fingers 8-1 through 8-k at the later stage performs their processes based on a chip rate and a symbol rate. There are no problems if ½ of the above described sampling rate $f_{sample}$ equals a value obtained by multiplying the chip rate or the symbol rate by an integer. Normally, the value is not a multiple of an integer. Therefore, since the rate which is the base of the operation timings is different between the early and later stages of an interface, thereby making the entire production of the entire device more difficult. Therefore, according to the present embodiment, the sampling rate converter 70 is provided to convert the sampling rate of the digital I and Q signals sampled by the digital quadrature detector 55 into a value obtained by multiplying the chip rate or the symbol rate by an integer. After performing the sampling rate conversion, the frequency shifter 56 converts a signal of a specified carrier into a base band, and the carrier demultiplexing filter 57 extracts only the signal of the specified carrier converted into the base band by the frequency shifter 56, and inputs the extracted signal to each of the fingers 8-1 through 8-k. The despreading and demodulating process in each of the fingers 8-1 through 8-k is performed based on a chip rate or a symbol rate. However, since each sampling rate of the I signal and the Q signal input to the fingers 8-1 through 8-k equals a value obtained by multiplying a chip rate or a symbol rate by an integer after converting the sampling rate by the sampling rate converter 70, the fingers 8-1 through 8-k can be easily designed. A signal output from the fingers 8-1 through 8-k is RAKE-synthesized by the synthesis unit 9 by the synthesis unit 9, and transmitted to a signal discrimination unit (not shown in the attached drawings) at the later stage.

Figure 16A:
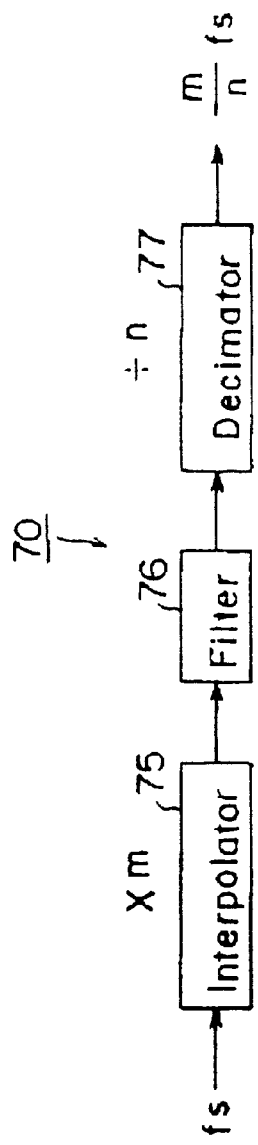
FIGS. 16A and 16B are block diagrams of the configuration of the sampling rate converter.
Figure 16B:
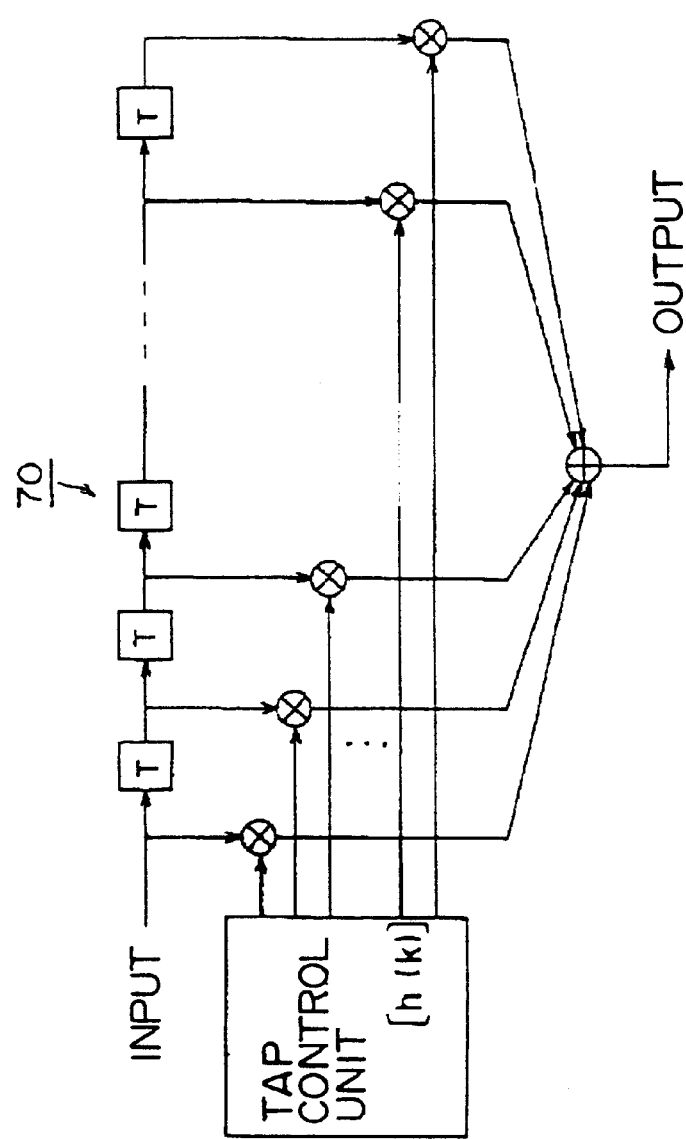

FIGS. 16A and 16B are block diagrams of the configuration of the sampling rate converter 70.

FIG. 16A shows the principle configuration of the sampling rate converter 70. When a signal at a sampling rate fs is input to an interpolator 75, a predetermined number of signals having the signal value of 0 are embedded in the sampling period to obtain the apparent sampling rate of the input signal as a multiple of m. Then, a filter 76 removes a spectrum component containing an alias other than a main-robe. Thus, the signal value of a sampling point which is set to an initial signal value of 0 and has newly been inserted during the sampling period is a signal value at the sampling point of an input signal. The sampling value of a signal obtained after passing through the filter 76 is obtained at specified intervals, and the sampling rate becomes 1/n of the initial rate. Thus, the sampling rate of the signal output from the sampling rate converter 70 is m/n·fs.

FIG. 16B is a block diagram of an example of the practical configuration of the sampling rate converter 70.

A sampling rate is converted using an FIR filter.

An input/output relational equation of an FIR filter used in converting a sampling rate is obtained by the following equation (5)

$$y(i) = \sum_{k=-\frac{N_{tap}}{2}}^{\frac{N_{tap}}{2}-1} h(mk + (ni)_m) x\left(\left[\frac{ni}{m}\right] - k\right) \quad (5)$$

$(n)_m$ = n modulo m

[a]: maximum integer smaller than a where i indicates time, x(i) indicates a discrete time signal of a filter input, y(i) indicates a discrete time signal of a filter output, h(k) is an impulse response of an alias removal filter designed using a tap-length $N_{tap}$ and an m-multiple oversample.

As an example, when m=4, n=3, and $N_{tap}$=8, the switching control of the tap coefficient h(k) with the configuration shown in FIG. 16B is shown below. A tap coefficient can be obtained by switching 32 coefficients (m×$N_{tap}$), h(−16) through h(15) according to the rule of equation (5).

time i=0: h (−16) h (−12) h (−8) h (−4) h (0) h (4) h (8) h (12)

time i=1: h (−13) h (−9) h (−5) h (−1) h (3) h (7) h (11) h (15)

time i=2: h (−14) h (−10) h (−6) h (−2) h (2) h (6) h (10) h (14)

time i=3: h (−15) h (−11) h (−7) h (−3) h (1) h (5) h (9) h (13)

time i=4: h (−16) h (−12) h (−8) h (−4) h (0) h (4) h (8) h (12)

time i=0: h (−13) h (−9) h (−5) h (−1) h (3) h (7) h (11) h (15)

.

.

.

where a practical value of the tap coefficient h(k) is obtained from the tap coefficient used when an FIR filter is used as a normal low-pass filter. However, in this case, a tap coefficients h(k) is not provided for all taps as described above, but the tap coefficient is sequentially switched at a specified time interval to obtain a sampling rate converting function.

Figure 17:
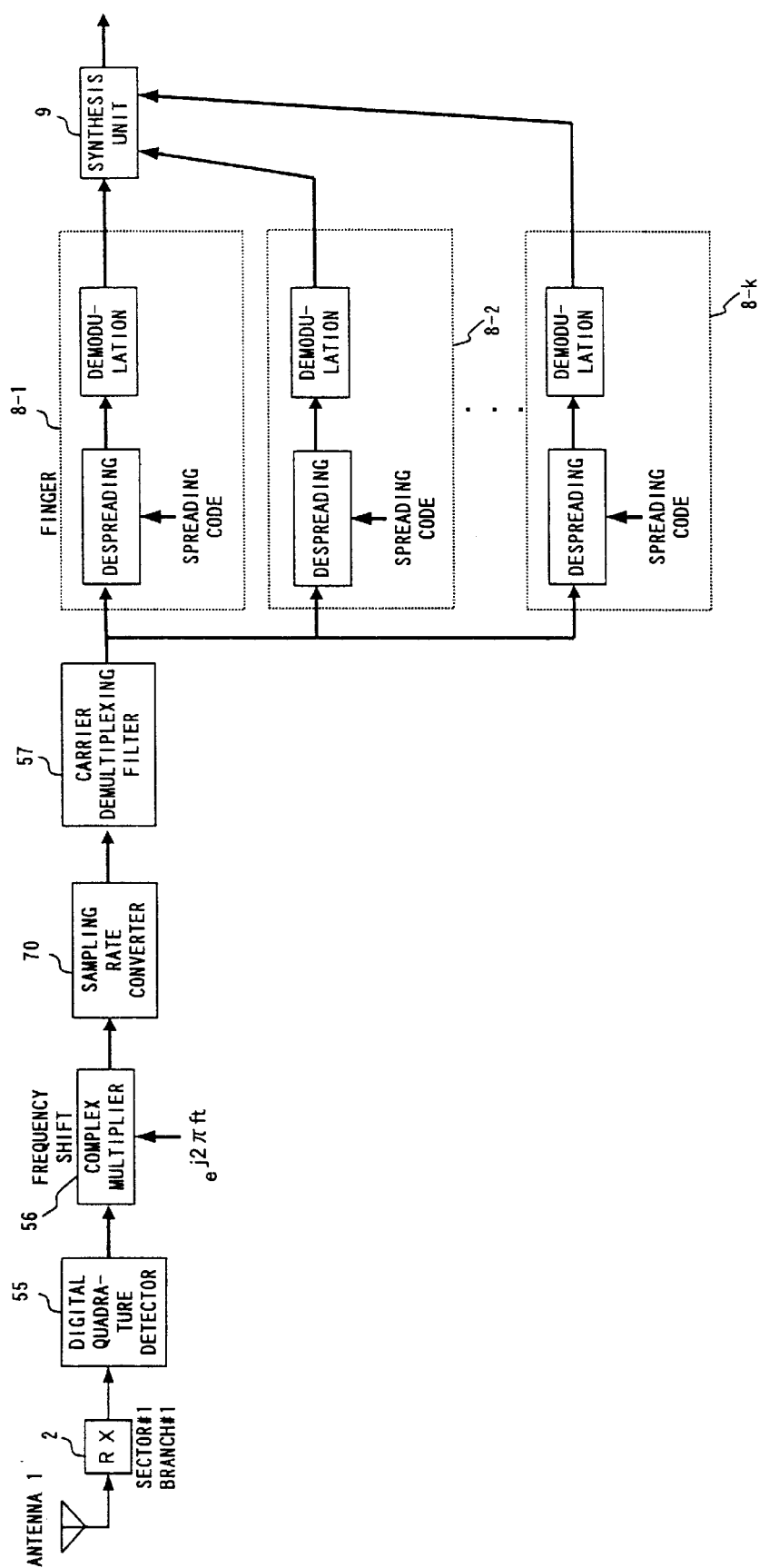
FIG. 17 is a block diagram according to the tenth embodiment of the present invention.

FIG. 17 is a block diagram according to the tenth embodiment of the present invention.

In FIG. 17, components also shown in FIG. 15 are assigned the same reference numbers.

According to the present embodiment, unlike the receiver shown in FIG. 15, the sampling rate converter 70 is positioned between the frequency shifter (complex multiplier) 56 and the carrier demultiplexing filter 57. Thus, the phase rotation of the frequency shifter 56 can be computed at sampling intervals expressed as a multiple of the IF frequency $f_{IF}$. Thus, when the multiplication coefficient exp $(j\phi_i)$ (i=0 through N−1) is expressed in a table and installed, the value of N for obtaining $\phi_N=2n\pi$ can be minimized. Therefore, a table storing the above described multiplication coefficient $\exp(j\phi_i)$ can be realized as a small table. That is, since the sampling rate of an output signal of a digital quadrature detector corresponds to an IF frequency, the phase matching the cycle of an IF frequency can be easily obtained using a multiplication coefficient. When a multiplication coefficient can be reset by a small value of N, the number of multiplication coefficients $\exp(j\phi_i)$ to be stored in the table can be reduced. The concept of the multiplication coefficient was described by referring to FIG. 6.

In FIG. 17, a signal received by the antenna 1 is converted into an IF signal by the RX 2, and then detected by the digital quadrature detector 55. At this time, a complex (I, Q) signal output from the digital quadrature detector 55 is ½ of the sampling rate $f_{sample}$ of the digital quadrature detector 55. The complex multiplication unit (frequency shifter) 56 multiplies the value by the periodic wave of a predetermined frequency, and shifts the frequency such that the center frequency of the base band signal transmitted on a specified carrier can be 0 Hz. Next, the sampling rate converter 70 converts the sampling rate, and the carrier demultiplexing filter 57 extracts only a signal of a specified carrier, and input to the fingers 8-1 through 8-k. A signal despread and demodulated by the fingers 8-1 through 8-k is synthesized by the synthesis unit 9, and transmitted to a signal discrimination unit (not shown in the attached drawings) at the later stage.

Figure 18:
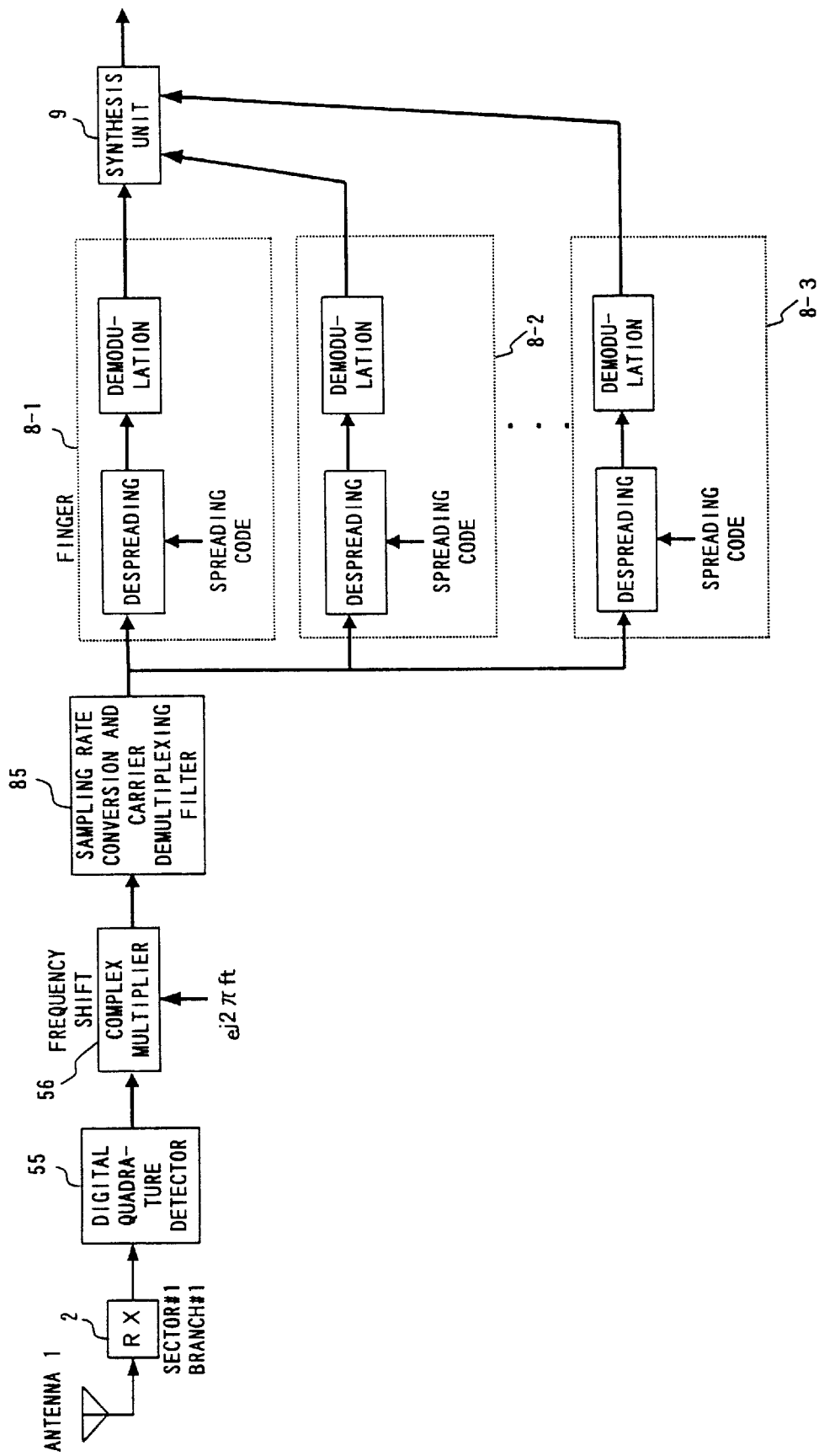
FIG. 18 is a block diagram according to the eleventh embodiment of the present invention.

FIG. 18 is a block diagram according to the eleventh embodiment of the present invention.

In FIG. 18, the components also shown in FIG. 17 are assigned the same reference numbers.

According to the present embodiment, a sampling rate converter and a carrier demultiplexing filter connected thereto can be shared. As shown in FIG. 16B, the sampling rate converter can be realized as an FIR filter for switching a tap coefficient according to a predetermined rule. The filter has the characteristic of removing an alias generated by interpolation. On the other hand, the carrier demultiplexing filter removes an adjacent carrier signal, and normally functions as a reception filter for a root roll-off characteristic. According to the present embodiment, the above described filter as a sampling rate converter, the alias removal filter, and the carrier demultiplexing filter are realized by one digital filter. In this sharing operation, the carrier demultiplexing filter requires a narrower band characteristic than the alias removal filter. Therefore, a process of removing an alias in converting a sampling rate can be performed by the characteristic of the carrier demultiplexing filter. Practically, the carrier demultiplexing filter can be designed as a tap coefficient switching filter as shown in FIG. 16B.

In FIG. 18, a signal received by the antenna 1 is converted into an IF signal by the RX 2, detected by the digital quadrature detector 55, and frequency-shifted by the frequency shifter 56. After a sampling rate is converted and carriers are demultiplexed by a sampling rate conversion and carrier demultiplexing filter 85, the fingers 8-1 through 8-k despread and demodulate the signal, and the synthesis unit 9 RAKE-synthesizes a signal to be transmitted to a signal discrimination unit (not shown in the attached drawings) at the later stage.

The configuration of the sampling rate conversion and carrier demultiplexing filter 85 according to the present embodiment is the same as the configuration of the sampling rate converter shown in FIG. 16B. The tap controlling method is the same as the method described above by referring to FIG. 16B. The difference between the sampling rate conversion and carrier demultiplexing filter 85 and the sampling rate converter 70 shown in FIG. 17 resides in the parameters of a tap coefficient h(k) and the number of taps $N_{tap}$.

That is, in the sampling rate converter 70 shown in FIG. 17, a filter tap coefficient depends on a transfer function $H_2(\omega)$ of a low-pass filter which has a band characteristic of removing an alias generated in the interpolating process when a sampling rate is converted. The number of taps is designed as $N_{tap2}$.

On the other hand, the filter tap coefficient of the sampling rate conversion and carrier demultiplexing filter 85 shown in FIG. 18 depends on a transfer function $H_1(\omega)$ of a carrier demultiplexing filter requiring a narrower band characteristic than in removing an alias generated in the sampling rate converting process. The number of taps is designed as $N_{tap1}$ (normally $N_{tap1} > N_{tap2}$).

Figure 19:
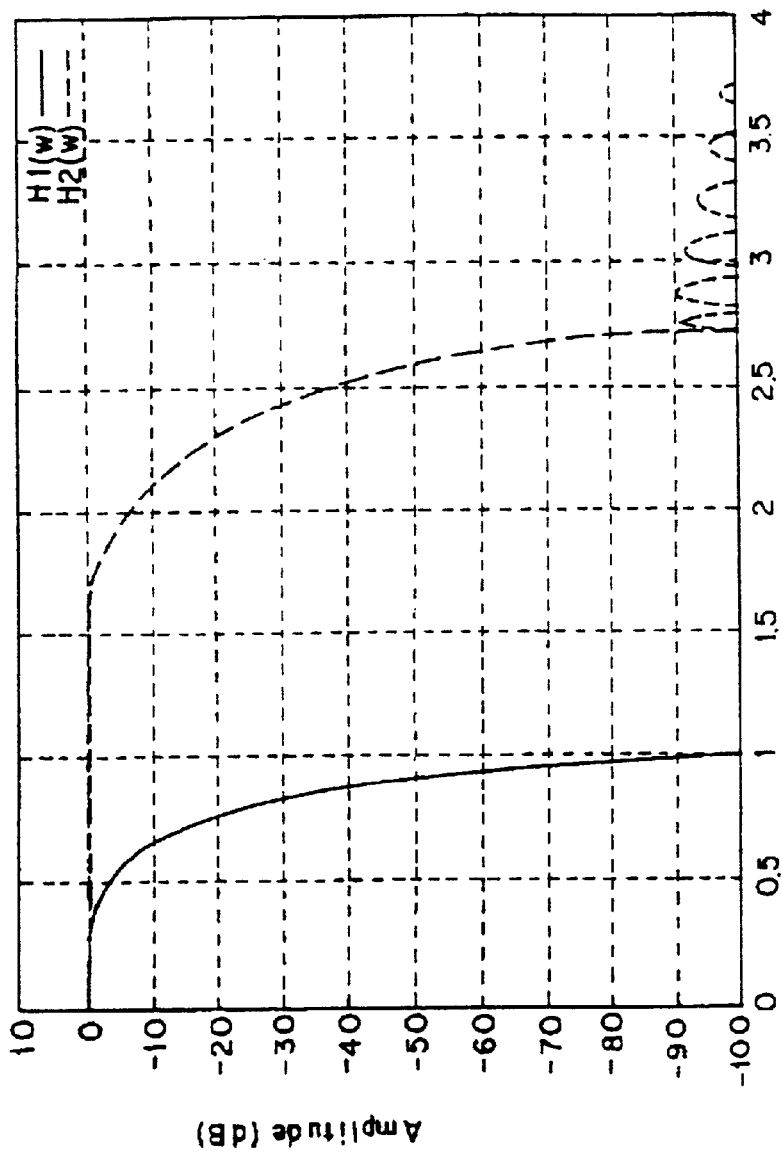
FIG. 19 shows examples of a transfer function of the sampling rate converter shown in FIG. 17 and an example of a transfer function of the sampling rate conversion and carrier demultiplexing filter shown in FIG. 18.

FIG. 19 shows examples of a transfer function of the sampling rate converter 70 shown in FIG. 17, and a transfer function of the sampling rate conversion and carrier demultiplexing filter 85 shown in FIG. 18. In FIG. 19, the solid line indicates $H_1(\omega)$, and the broken line indicates $H_2(\omega)$.

In FIG. 19, $H_1(\omega)$ indicates a reception root roll-off characteristic, and $H_2(\omega)$ indicates the low-pass filter characteristic of the cutoff frequency f=2 for removing an alias generated in 8-times oversampling. The frequency along the horizontal axis is expressed after being normalized using a chip rate. As shown in FIG. 19, since $H_1(\omega)$ is smaller than $H_2(\omega)$ in width of transfer characteristic, the function of removing the alias in a sampling rate converter can be replaced with a function of a carrier demultiplexing filter. Therefore, the transfer function of the sampling rate conversion and carrier demultiplexing filter 85 shown in FIG. 18 can be designed such that it can be the same as the carrier demultiplexing filter 57 shown in FIG. 17 and a tap coefficient can be switched, both sampling rate converting and carrier demultiplexing functions can be realized by one FIR filter.

As described above, according to the present embodiment, the number of signal lines of an interface for connecting an RF unit and a base band process unit can be reduced in the receiving unit of a cellular CDMA base station. In addition, a CDMA base station with the sector-free configuration for receiving a plurality of carriers can be easily realized.

Furthermore, since the signal line of the above described interface is independent of the number of carriers, it is possible to design the base band processing unit as a module using the same interface. Thus, the number of channels accommodated by a base station can be increased stepwise.

Furthermore, in a CDMA system accommodating a plurality of chip rates, it is possible to change a chip rate by switching a base band process. As a result, the configuration flexibly corresponding to a multi-chip rate can be realized.

In addition, through digital quadrature detection, a high precision, high stability, adjustment-free, and even quadrature demodulation characteristic can be realized. Then, in combination use of a sampling rate converter, a desired chip rate can be selected independent of a chip rate, thereby realizing a configuration with more flexible design.

According to the present invention, in a receiver using a CDMA signal, the number of signal lines of an interface between a circuit operating at a rate of a signal of an RF band and a circuit operating at a rate of a signal of a base band can be reduced. Furthermore, the receiver can be easily realized with a sector-free configuration.

What is claimed is:

1. A receiver demodulating a spread-spectrum signal modulated into a plurality of carrier frequencies, comprising:
    a detection unit collectively converting a signal obtained by multiplexing carrier signals of a plurality of carrier channels into a multiplexed signal of a predetermined frequency band;
    a carrier demultiplexing unit carrier-demultiplexing and frequency-shifting a signal obtained by said detection unit; and
    a despreading and demodulation unit despreading and demodulating a base band signal of each channel obtained by said demultiplexing and frequency-shifting.

2. The receiver according to claim 1, wherein
said carrier demultiplexing unit comprises:
    a carrier demultiplexing filter unit performing the demultiplexing process; and
    a frequency shift unit converting a center frequency of a carrier signal of each demultiplexed channel into 0 Hz.

3. The receiver according to claim 2, wherein
said frequency shift unit comprises a complex multiplier for generating an amount of a phase rotation and a loop of a delay unit, and initializes a value of the delay unit on a predetermined cycle.

4. The receiver according to claim 1, wherein
said carrier demultiplexing unit comprises:
    a frequency shift unit shifting a center frequency of a signal of a carrier of a specified channel contained in the multiplexed signal into 0 Hz; and
    a filter unit extracting only a carrier signal whose center frequency has been shifted into 0 Hz by said frequency shift unit from the multiplexed signal containing signals having a plurality of carriers.

5. The receiver according to claim 4, further comprising:
a selector unit connecting an output of said filter unit to an input of the plurality of despreading and demodulation units, wherein
outputs of said plurality of despreading and demodulation unit are synthesized for RAKE reception.

6. The receiver according to claim 2, further comprising:
a selector unit connecting an output of said carrier demultiplexing filter unit to an input of said despreading and demodulation unit, wherein
    outputs of said despreading and demodulation unit are synthesized for RAKE reception.

7. The receiver according to claim 1, wherein
plural systems of said detection units, said carrier demultiplexing units, and said despreading and demodulation units are provided; and
    a selector unit capable of connecting an output of each of said plural systems of despreading and demodulation units to an input of any despreading and demodulation unit is further provided.

8. The receiver according to claim 1, wherein
plural systems of said detection units, said carrier demultiplexing units, and said despreading and demodulation units are provided; and
    a selector unit capable of connecting a signal received from each of said plural systems of detection units to any carrier demultiplexing unit is further provided.

9. The receiver according to claim 1, wherein:
said carrier demultiplexing unit comprises a digital filter performing said carrier demultiplexing process; and
said digital filter operates only a tap corresponding to a despreading timing in said despreading and demodulation unit.

10. The receiver according to claim 1, wherein
said detection unit samples a received signal using an A/D converter, and performs quadrature detection by performing a digital process on a digital value obtained by said sampling process.

11. The receiver according to claim 10, wherein
said carrier demultiplexing unit comprises:
    a sampling rate conversion unit converting a rate of a signal obtained by performing quadrature detection through the digital process into a chip rate/symbol rate, or a multiple of the chip rate/symbol rate.

12. The receiver according to claim 11, wherein
said carrier demultiplexing unit frequency-shifts a center frequency of a signal having a specified carrier into 0 Hz, and then converts a sampling rate of the signal having the specified carrier through said sampling rate conversion unit to demultiplex the signal having the specified carrier from the signal whose sampling rate has been converted.

13. The receiver according to claim 11, wherein
a function of said sampling rate conversion unit and said carrier demultiplexing function are realized by a digital filter having a tap coefficient switching function.

14. A receiving method for demodulating a spread-spectrum signal modulated into a plurality of carrier frequencies, comprising:
    (a) collectively converting a signal obtained by multiplexing carrier signals of a plurality of carrier channels into a multiplexed signal of a predetermined frequency band;
    (b) carrier-demultiplexing and frequency-shifting a signal obtained by step (a); and
    (c) despreading and demodulating a base band signal of each channel obtained by said demultiplexing and frequency-shifting.

15. The receiving method according to claim 14, wherein
said step (b) converts a center frequency of a carrier signal of each demultiplexed carrier into 0 Hz after demultiplexing a specified carrier signal from the multiplexed signal.

16. The receiving method according to claim 14, wherein
said step (b) extracts only a carrier signal whose center frequency has been shifted into 0 Hz from the multiplexed signal containing signals having a plurality of carriers after shifting the center frequency of the carrier signal of the specified channel contained in the multiplexed signal into 0 Hz.

17. The receiving method according to claim 14, wherein
a RAKE receiving process is performed.

18. The receiving method according to claim 14, wherein said step (b) uses a digital filter to operate only a tap corresponding to a despreading timing in said step (c).

19. The receiving method according to claim 14, wherein said step (a) performs quadrature detection by sampling a received signal using an A/D converter, and performing a digital process on a digital value obtained in the sampling process.

20. The receiving method according to claim 19, wherein said step (b) converts a rate of a signal obtained by quadrature detection in the digital process into a chip rate/symbol rate, or a multiple of the chip rate/symbol rate.

21. The receiving method according to claim 20, wherein after frequency-shifting a center frequency of a signal having a specified carrier into 0 Hz, said step (b) converts a sampling rate of the signal having the specified carrier using said sampling rate conversion unit, and demultiplexing the signal having the specified carrier from the signal whose sampling rate has been converted.

22. The receiving method according to claim 20, wherein said sampling converting function and said carrier demultiplexing function are realized by a digital filter having a tap coefficient switching function.

* * * * *